(12) United States Patent  (10) Patent No.: US 7,773,457 B2
Crice et al.  (45) Date of Patent: Aug. 10, 2010

(54) WIRELESS EXPLORATION SEISMIC SYSTEM

(75) Inventors: Douglas Crice, Grass Valley, CA (US); Mihai Beffa, Cupertino, CA (US)

(73) Assignee: Wireless Seismic, Grass Valley, CA (US)

( * ) Notice: Subject to any disclaimer, the term of this patent is extended or adjusted under 35 U.S.C. 154(b) by 745 days.

(21) Appl. No.: 11/538,744

(22) Filed: Oct. 4, 2006

(65) Prior Publication Data

US 2008/0049554 A1 Feb. 28, 2008

Related U.S. Application Data

(60) Provisional application No. 60/724,271, filed on Oct. 7, 2005, provisional application No. 60/821,217, filed on Aug. 2, 2006.

(51) Int. Cl.
G01V 1/00 (2006.01)
G01V 1/28 (2006.01)
G06F 19/00 (2006.01)

(52) U.S. Cl. ............... 367/80; 367/76; 367/77; 367/78; 367/79; 702/1; 702/14; 702/15; 702/75; 702/76; 702/77; 702/78; 702/79

(58) Field of Classification Search ............. 367/76–80; 702/1, 14, 15, 75–79
See application file for complete search history.

(56) References Cited

U.S. PATENT DOCUMENTS

| 3,886,494 | A | | 5/1975 | Kostelnicek et al. |
|---|---|---|---|---|
| 4,815,044 | A | * | 3/1989 | Deconinck et al. ............ 367/77 |
| 4,908,803 | A | * | 3/1990 | Rialan .......................... 367/77 |
| 5,706,250 | A | | 1/1998 | Rialan et al. |
| 6,070,129 | A | * | 5/2000 | Grouffal et al. ............... 702/32 |
| 6,188,962 | B1 | | 2/2001 | Morgan et al. |
| 6,219,620 | B1 | * | 4/2001 | Park et al. ..................... 702/14 |
| 6,226,601 | B1 | | 5/2001 | Longaker |
| 6,480,497 | B1 | * | 11/2002 | Flammer et al. ............. 370/400 |
| 7,124,028 | B2 | * | 10/2006 | Ray et al. ....................... 702/1 |
| 7,573,782 | B2 | * | 8/2009 | Barakat ........................ 367/77 |
| 2003/0117893 | A1 | | 6/2003 | Bary |
| 2003/0202424 | A1 | | 10/2003 | Burkholder et al. |
| 2006/0291327 | A1 | * | 12/2006 | Barakat ........................ 367/14 |
| 2007/0036031 | A1 | * | 2/2007 | Barakat et al. ................ 367/76 |

* cited by examiner

*Primary Examiner*—Jack Keith
*Assistant Examiner*—Chuong P Nguyen
(74) *Attorney, Agent, or Firm*—Marsh Fischmann & Breyfogle LLP

(57) ABSTRACT

Systems and methods are provided for acquiring seismic data using a wireless network and a number of individual data acquisition modules that are configured to collect seismic data and forward data to a central recording and control system. In one implementation, a number of remote modules (301) are arranged in lines. Base station modules (302) receive information from the lines and relay the information to a central control and recording system (303). Radio links operating on multiple frequencies (F1-F12) are used by the modules (301). For improved data transfer rate, radio links from a remote module (301) leap past the nearest remote module to the next module closer to the base station.

13 Claims, 16 Drawing Sheets

WIRELESS REMOTE ACQUISITION AND RELAY MODULE

BASE STATION RELAY MODULE

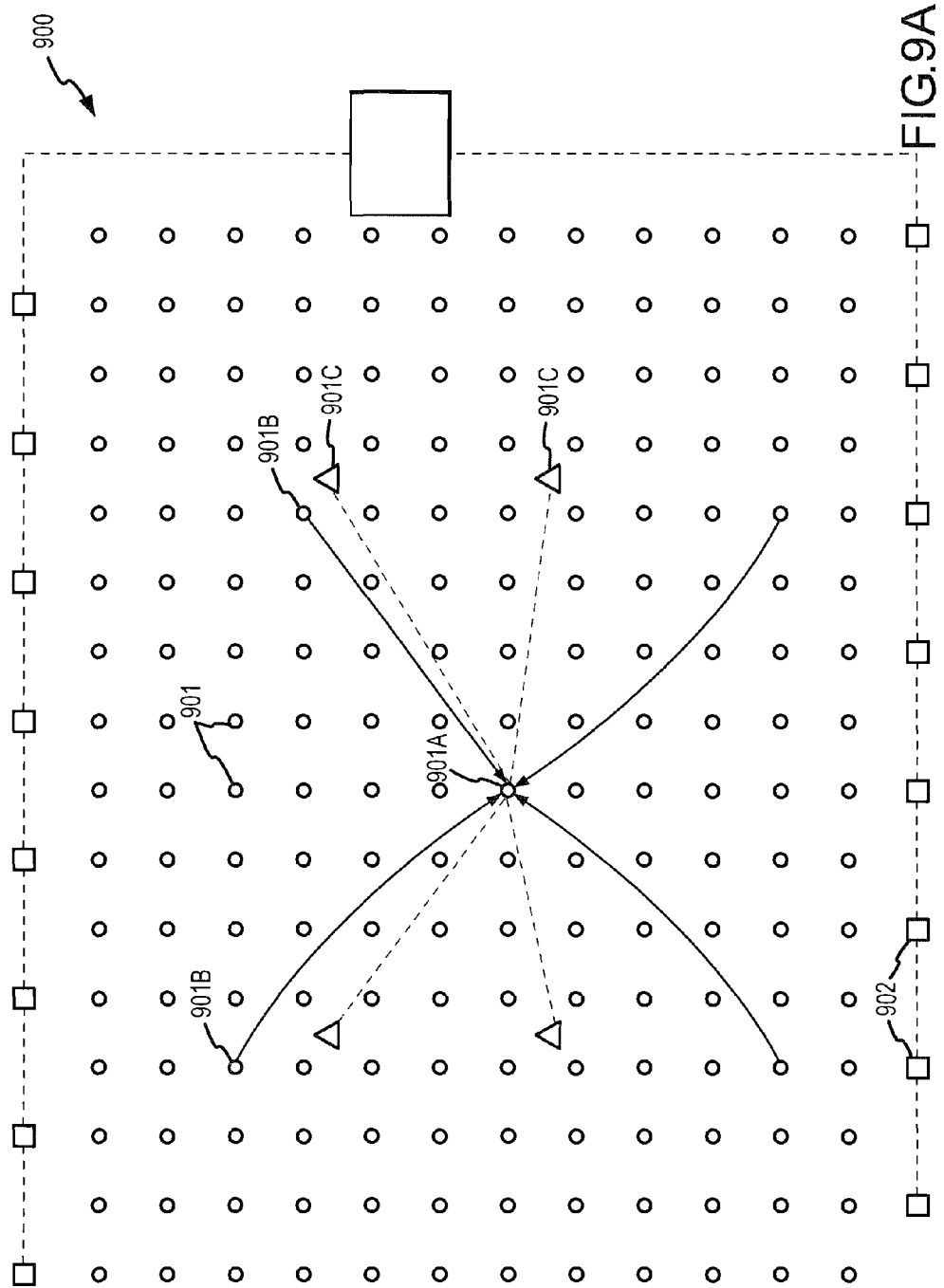

WIRELESS EXPLORATION SEISMIC SYSTEM

CROSS-REFERENCE TO RELATED APPLICATION

This application claims priority under 35 U.S.C. 119 to U.S. Provisional Application No. 60/724,271, filed on Oct. 7, 2005, and U.S. Provisional Application No. 60/821,217, filed on Aug. 2, 2006, the contents of which are incorporated herein as if set forth in full.

FIELD

This invention relates to exploration seismographs, specifically to seismic survey systems where the data signals from multiple sensors are transmitted by wireless means. The invention allows for wirelessly reading out a seismic array, even in the case of rapidly repeating vibrating energy source surveys, without backlogging of data or delay of the survey process.

BACKGROUND

Seismic surveys are often used by natural resource exploration companies and other entities to create images of subsurface geologic structure. These images are used to determine the optimum places to drill for oil and gas and to plan and monitor enhanced resource recovery programs among other applications. Seismic surveys may also be used in a variety of contexts outside of oil exploration such as, for example, locating subterranean water and planning road construction.

A seismic survey is normally conducted by placing an array of vibration sensors (accelerometers or velocity sensors called "geophones") on the ground, typically in a line or in a grid of rectangular or other geometry. Vibrations are created either by explosives or a mechanical device such as a vibrating energy source or a weight drop. Multiple energy sources may be used for some surveys. The vibrations from the energy source propagate through the earth, taking various paths, refracting and reflecting from discontinuities in the subsurface, and are detected by the array of vibration sensors. Signals from the sensors are amplified and digitized, either by separate electronics or internally in the case of "digital" sensors. The survey might also be performed passively by recording natural vibrations in the earth.

The digital data from a multiplicity of sensors is eventually recorded on storage media, for example magnetic tape, or magnetic or optical disks, or other memory device, along with related information pertaining to the survey and the energy source. The energy source and/or the active sensors are relocated and the process continued until a multiplicity of seismic records is obtained to comprise a seismic survey. Data from the survey are processed on computers to create the desired information about subsurface geologic structure.

In general, as more sensors are used, placed closer together, and/or cover a wider area, the quality of the resulting image will improve. It has become common to use thousands of sensors in a seismic survey stretching over an area measured in square kilometers. Hundreds of kilometers of cables may be laid on the ground and used to connect these sensors. Large numbers of workers, motor vehicles, and helicopters are typically used to deploy and retrieve these cables. Exploration companies would generally prefer to conduct surveys with more sensors located closer together. However, additional sensors require even more cables and further raise the cost of the survey. Economic tradeoffs between the cost of the survey and the number of sensors generally demand compromises in the quality of the survey.

In addition to the logistic costs, cables create reliability problems. Besides normal wear-and-tear from handling, they are often damaged by animals, vehicles, lightning strikes, and other problems. Considerable field time is expended troubleshooting cable problems. The extra logistics effort also adds to the environmental impact of the survey, which, among other things, adds to the cost of a survey or eliminates surveys in some environmentally sensitive areas.

Thus, there exists a need in the art to provide improved systems and methods for wireless seismic data acquisition. As will be appreciated from the following disclosure, the systems and methods according to the present invention address these, and a number of other problems related to seismic data acquisition.

SUMMARY

The present invention provides systems and methods for acquiring seismic data using a wireless network and a number of individual data acquisition modules that are configured to collect seismic data and forward the data to a central recording and control system. The invention thus enables both a cable-less layout of the data acquisition modules as well as a wireless read out of the seismic data. Using a cable-less layout of data acquisition modules is advantageous over conventional systems using cable communications for several reasons. For example, a cable-less system is not as susceptible to damage caused by wear and tear, animals, lightning strikes, etc. Additionally, a cable-less system could easily be placed across rivers, highways, or other obstacles, whereas it is difficult to implement a seismic survey system that uses cables in these areas. Moreover, cable based seismic surveys require a relatively large number of vehicles and manpower to transport and lay cables spanning several square kilometers.

The ability to capture the data wirelessly is potentially advantageous as well. For instance, when a single cable is damaged, all data from remote data acquisition modules located on the distant end of the damaged cable may be lost. This type of problem is not present in systems where the seismic data is transmitted wirelessly. In particular, rerouting the data is much more feasible using a wireless network, which potentially provides for a more reliable system.

Certain proposed cable-less and/or wireless seismic acquisition systems have required manual read outs or have otherwise involved a read out procedure that resulted in delaying the seismic survey process. It has been recognized that it is important to provide for capture of data from a wireless array in a manner that avoids backlogging of data or delaying the survey process. That is, the system can operate much more efficiently and inexpensively if the data capture can be accomplished without delaying the survey process (e.g., without delaying subsequent seismic events). Conventionally, the survey process involves placing an array of vibration sensors (accelerometers or velocity sensors called geophones) on the ground, typically covering several square kilometers. Then a vibration/seismic event may be propagated through the earth and detected by these sensors. Signals from the sensors are captured and analyzed by a processing unit. Most commonly, seismic events are created by one of two methods. First, explosives may be used to generate vibrations in the earth. Alternatively, a vibrating energy source vehicle may be used. A vibrating energy source vehicle is a vehicle designed for creating vibrations in the ground. Typically, a vibrating energy source vehicle will create a vibration in one location for a short period of time (e.g., fifteen or twenty seconds). Then, the vehicle may move to another location nearby and immediately begin generating another vibration. There may only be a few seconds between each vibration event. This process may continue for several hours until the desired amount of seismic data is acquired. The survey process is very expensive in terms of the required amount of equipment and manpower, so any delays in the measurement process are extremely costly. Thus, it will be appreciated that the seismic data is preferably either stored locally for the entire survey, or otherwise transferred, for example, to a central storage system, at a rate sufficient to accommodate the operation of the vibration source without causing a delay.

In addition to the items noted above, there are a number of attributes that have been recognized as being useful to provide a commercially desirable wireless seismic survey system. These attributes include the following:

1. The system cost should be approximate to or less than that of a wired system.
2. The system should perform in uneven terrain and around or over obstacles, across an area measured in square kilometers.
3. The system should be usable worldwide without complex radio licensing issues.
4. Power consumption should be low enough that handling and replacing batteries does not create undue logistic problems.
5. Seismic data should be made available for inspection in near real-time to ensure quality and avoid the need to repeat some or all of the seismic data acquisition.
6. The system should be capable of scaling up to thousands of sensors.
7. The system should meet the technical performance specifications of contemporary wired systems.

Various aspects of the present invention involve a wireless transfer protocol to enable the capture of seismic data from a seismic array without delaying the seismic survey. In this regard, it will be noted that the volume of data generated by an array of vibration sensors may be significant. For instance, if each vibration sensor acquires 500 samples per second with a resolution of 24 bits per sample, the sample size for each sensor is 12,000 bits per second. For a 20 second vibration (i.e. seismic event) the resulting sample size is 240K bits per sensor. It is not uncommon for a plurality of sensors to be aligned into lines or strings that contain a hundred or more sensors. Further, multiple lines or strings may be disposed in parallel to define an array of sensors that cover a desired geographic area. For a seismic survey that utilizes 1000 sensors, 240,000,000 bits of data may be generated for each seismic event. Accordingly, the wireless transfer of all the data from the sensors to a central recording system(s) at a rate sufficient to keep up with the seismic events can be problematic due to limited bandwidth. In one implementation of the present invention, individual data acquisition modules transmit seismic data to a neighboring or near neighboring module, which, in turn, relays the received seismic data, together with its own data, on to a further module. This process of data forwarding continues until the data reaches either a line tap or a central recording and control system. This arrangement is desirable for several reasons. First, since the data acquisition modules are only transmitting data to nearby modules, rather than directly to a central location, relatively low power transmissions can be utilized. The savings in power allows the modules to operate longer without battery replacement, and/ or to operate using batteries with a smaller capacity. Additionally, low power transmissions reach a smaller area, which allows fewer channels to be utilized (or available channels to accommodate a larger number of acquisition modules) because they can be reused in different areas of the array without interference. Additionally, the use of lower power signals may enhance module location information using signal strength based techniques. It will be appreciated, however, that it is problematic to reconcile the desire for such serial data transfer with the desired read out rates as described above. These potentially conflicting objectives are addressed by the invention as set forth herein.

In accordance with one aspect of the present invention, a seismic array is provided that can wirelessly read out an array using serial data transfer at a rate sufficient to avoid delaying operation of a vibrating energy source. As noted above, a vibrating energy source typically vibrates for a few seconds to define a seismic event, then moves to anther location and immediately starts vibrating again. This cycle may be repeated in only a matter of seconds, e.g., 20-30 seconds. It is desirable to read out the resulting seismic data to a base station or the like in serial fashion such that each module needs only to communicate with a neighboring or near neighboring module, and low transmission powers can be used. However, serial data transfer generally involves increasing data transfer rate requirements, as a function of the length of the serial data transfer path, for a given overall array read out time.

The present aspect of the invention provides a method and apparatus ("utility") that involves providing an array for obtaining seismic data corresponding to operation of a repeating vibrating energy source. A read out mechanism is provided in connection with the array that defines at least one serial data transfer path for reading out the seismic data. The read out mechanism is operated to read out the array at a rate sufficient to avoid delaying operation of the vibrating energy source. For example, the read out mechanism may be operative to read out a serial data transfer path involving multiple modules (e.g., more than about 10 modules) in no more than about 20 seconds.

In accordance with another aspect of the present invention, more than one seismic data acquisition module in a given serial data transfer path can transmit data simultaneously. As noted above, serial data transfer paths are desirable but can result in increased data transfer rate requirements. In order to address this potential issue, more than one module in a serial data transfer path can transmit at a time, for example, by employing an appropriate multiplexing mechanism to avoid interference. Thus, a utility in accordance with the present aspect of the invention involves: providing an array including at least one serial data transfer path, where data is serially transferred between multiple modules in route to a base station or other collection point; and operating the array such that at least two of the multiple modules on the serial data transfer path transmit concurrently. In this manner, higher duty cycles can be achieved for individual transmitters, resulting in enhanced read out efficiency.

In accordance with yet another aspect of the present invention, different modules on a given serial data transmission pathway of a seismic array use different transmission frequencies. Again, serial data transmission pathways are desirable but can raise certain issues relating to array read out rates. These issues can be addressed by using multiple frequencies in a single serial data transfer path so as to, for example, allow for frequency division multiplexing. A corresponding utility in accordance with the present aspect of the invention involves: providing an array including at least one serial data transfer path, having multiple modules; and operating the array such that a first module on the serial data transfer path transmits at a first frequency and a second module on the serial data transfer paths transmits at a second frequency different than the first frequency. For example, different frequencies can be assigned to all modules within receiving range of one another that transmit concurrently.

In accordance with another aspect of the present invention, multiple multiplexing mechanisms are implemented in connection with a serial data transfer path of a seismic array. For example, each multiplexing mechanism may allow for coordinated operation of the transmitters of the serial data transfer path to enable improved read out rates without undue interference. In one implementation, both time division multiplexing and frequency division multiplexing are used in connection with a serial data transfer path. For example, the time division multiplexing may be implemented such that only one-half (or one-third, one-fourth, etc.) of the transmitters in the serial data transfer path are transmitting in any defined time interval. Those transmitters that transmit at the same time (or at least those transmitting at the same time and within receiving range of a receiver in the pathway) can be assigned different frequency channels and/or can utilize another multiplexing mechanism such as code division multiplexing. Where multiple serial pathways are present in the array, such multiplexing can also be implemented so as to avoid interpathway interference.

In order to facilitate the capture of seismic data from an array of seismic data acquisition modules while avoiding delays in the seismic survey process, it may be desirable to provide synchronized transmission of seismic data from a number of acquisition modules that utilize a common wireless serial data transmission path for reporting seismic data. That is, along a serial data transmission path defined by a number of acquisition modules, a first subset of the acquisition modules may be operative to simultaneously transmit seismic data to a second subset of the acquisition modules. Such an arrangement may allow for simultaneous transfer of seismic data from a number of upstream acquisition modules to a number of downstream acquisition modules that are located nearer to a data collection point (e.g., line tap or base station). For instance, every other acquisition module in a serial data transfer path may be operative to transmit seismic data to an adjacent downstream acquisition module during a first time interval. Likewise, when the downstream acquisition modules receive data from an adjacent upstream module, the downstream modules may transmit the received data and/or additional seismic data further downstream during a second interval. Accordingly, by repeating the process multiple sets of seismic data may be simultaneously transferred step-by-step from a plurality of acquisition modules to one or more base stations and/or a central recording and control system.

In order to effect such simultaneous transfer of seismic data from a plurality of acquisition modules, one aspect of the present invention provides a utility for transmitting seismic data. The utility involves disposing multiple seismic data acquisition modules in an array where each acquisition module is operative to wirelessly communicate with at least one other acquisition module in the array. Accordingly, such communication between the acquisition modules allows for defining a data transmission path through the array. A base station is provided that is operative to receive seismic data from at least one acquisition module in the array. In this regard, the base station is in wireless communication with the data transmission path. In order to transmit seismic data from the plurality of acquisition modules, the utility further involves first transmitting first seismic data from at least a first module of a first subset of the acquisition modules to at least a first module of a second subset of the acquisition modules during a first transmission period. After the first transmission period, the first seismic data may be transmitted from the first module of the second subset of acquisition modules to a second module of the first subset of acquisition modules during a second transmission period. In this regard, the first set of seismic data may be relayed by the data transmission path towards the base station.

In order to transmit the data towards the base station, during each of the transmitting steps, individual acquisition modules may transmit seismic data to another seismic data acquisition module that is located nearer to the base station. In this regard, the data may be relayed from remotely located acquisition modules to acquisition modules that are located nearer to the base station. Further, one or more acquisition modules located within the transmission range of the base station may transmit the seismic data to the base station.

In addition to re-transmitting the first seismic data received from the first module of the first subset, the first module of the second subset may be operative to append additional seismic data (i.e., generated by the first module of the second subset) to the second module of the first subset. In this regard, during each transmitting step, additional data may be appended to the seismic data received from a remotely located data acquisition module. Accordingly, the first and second transmitting steps between the first and second subsets of acquisition modules may be repeated for additional modules of each subset until all seismic data from the plurality of acquisition modules is received by the base station.

In any arrangement, each seismic data acquisition module is operative to generate seismic data in response to a seismic event. In the case of a vibrating energy source, the event may last several seconds (e.g., 20 seconds). Accordingly, it may be desirable to begin data transmission prior to the end of the seismic event. That is, initiating data transmission before the seismic event ends may significantly reduce the time required to complete the transmission of the entire data set collected for the seismic event. Such transmission may be completed substantially in real-time or prior to the initiation of a second seismic event. In order to effect such transmission during the seismic event, each acquisition module may be operative to packetize seismic data as it is generated. Resulting packets (e.g., of a predetermined data size or temporal period) may include information identifying the acquisition module that generated the data as well as the acquisition time for the packet. The packet may then be relayed to the base station (e.g., via one ore more relays), to a central control and storage system or another location where the packets may be stored and/or reassembled. That is, multiple packets from individual seismic acquisition modules for a single seismic event may be reassembled into a single data file at a location removed from the acquisition modules.

In one implementation, in order to facilitate the simultaneous transfer from the first subset of acquisition modules to the second subset of acquisition modules, each of the plurality of seismic data acquisition modules is assigned a transmission frequency for use in transmitting the seismic data. Further, due to the potentially large number of acquisition modules forming a single serial data transmission path, it may be desirable and/or necessary to assign first and second seismic data acquisition modules within a serial transmission path a common transmission frequency. That is, due to limited available transmission frequencies, it may be useful to reuse one or more frequencies. The transmission power and/or physical spacing of the modules may be selected so as to prevent interference between modules having a common transmission frequency. Moreover, when a common frequency is reused in a single serial data transmission path for a common transmission period, it may be desirable that the modules utilizing the common frequency are separated by a distance that is greater than the transmission range of the modules. It will be appreciated that modules utilizing a common transmission frequency may further be arranged such that they transmit seismic data during temporally distinct transmission periods or so that they utilize a further multiplexing mechanism, such as code division multiplexing, to reduce or avoid interference. The spacing and/or transmission power of the acquisition modules may also depend on transmission frequencies in one or more adjacent transmission paths utilized to transmit seismic data from additional arrays.

According to another aspect of the invention, a utility is provided for enhancing a data transfer rate between a plurality of seismic data acquisition modules defining an array and a base station that is operative to gather seismic data from the array by coordinating the operation of multiple modules that communicate directly with the base station. The utility involves disposing a plurality of seismic data acquisition modules in a physical path e.g., a line of modules. In this regard, each seismic data acquisition module in the physical path is operative to wirelessly communicate with at least one other seismic data acquisition module in the path such that the data is serially transferred from remote modules to modules located nearer to the base station. First and second serial data transfer paths are defined through the physical path. These first and second (or additional) data transfer paths may be formed by alternate or other pattern of acquisition modules along the length of the physical path. Accordingly, the first and second data transfer paths are each operative to relay data for the modules that form each path, and the base station is preferably operative to alternately receive transmission of seismic data from the first and second transmission paths. In this regard, the base station may be operative to substantially continually receive transmissions of seismic data from the first and second transmission paths. For example, the base station may be operative to alternately receive transmissions from the first and second paths so that the base station receiver has a substantially 100% duty cycle.

According to another aspect of the invention, a utility is provided for relaying seismic data through a series of acquisition modules where a given module uses different frequencies for receiving and transmitting data. The utility utilizes a plurality of seismic data acquisition modules that are disposed in a series and are operative to wirelessly communicate with at least one upstream acquisition module and at least one downstream acquisition module for the purposes of relaying seismic data therebetween. In this regard, the seismic data acquisition modules are typically operative to receive upstream seismic data from at least one upstream seismic data acquisition module and transmit the upstream seismic data to a downstream seismic data acquisition module. Further, to effect transmission of multiple sets of upstream data to multiple sets of downstream acquisition modules, it may be useful to assign different transmission and receiving frequencies to each of the data acquisition modules. Typically, this will require that any individual data acquisition module be operative to receive upstream data on a first transmission frequency and provide the upstream data, as well as any data generated by the receiving acquisition module, to a downstream acquisition module on a second transmission frequency.

Accordingly, each individual acquisition module may be tuned to a receiving frequency associated with an upstream acquisition module and tuned to a transmitting frequency that corresponds to receiving frequency of a downstream acquisition module. A single antenna or multiple antennae may be used in this regard. The acquisition module may be operative to receive transmissions from an immediately adjacent upstream acquisition module and provide data to an immediately adjacent downstream acquisition module. In another arrangement, the acquisition module may be operative to receive transmissions from a non-adjacent upstream acquisition module and transmit to a non-adjacent downstream acquisition module. In this regard, receptions and transmissions may skip adjacent acquisition modules such that first and second serial data transmission paths are interleaved within a physical path of seismic acquisition modules.

In accordance with another aspect of the invention, at least some of the modules are configured to be self-locating. In order for the data captured by the sensors to be processed, the geographic location of each sensor must be determined. Rather than manually measuring the location of thousands of sensors as has been previously done, the present invention may use various methods to determine the location of at least some of the modules automatically. For example, in one embodiment, each module may include a Global Positioning System (GPS) receiver. The modules may use the receiver to self-locate, and further may wirelessly transfer the location data to a central recording system.

In another embodiment, only some or none of the modules or base stations may be equipped with GPS receivers. The system may advantageously use RF technology to determine the location of at least some of the modules. For example, a module or base station may propagate a signal from its transmitter to several other remote modules. The other modules or base station(s) may individually record the time that the signal was received from the first module or base station and/or the strength of the signal. Using the time the signal was received at each remote module, the direction from which the signal was received, the signal strength or other parameters, the location of the module may be determined. Thus, if the location of one or more modules or base stations is known, the location of the remote module propagating the signal can be determined. It will be appreciated that this aspect is not limited to using one particular RF based method to determine the location of a remote module. A person skilled in the art will recognize that there are a number of methods that utilize RF technology that may be employed as will be discussed in more detail below. Moreover the location of the module may be determined based on signals received at the module from other modules or base stations, or the location of the module may be determined based on signals transmitted from the module to other modules or base stations (e.g., the technology may be module-based or external).

In yet another embodiment, RF methods of location may be used in combination with GPS methods. For example, a fraction of the modules and/or base station may include GPS receivers. Since GPS methods give an accurate location, these modules or base stations may be used as reference locations. Then, the reference locations may be used to calculate the actual location of other modules that are not equipped with GPS receivers using the relative location calculated using RF based methods. For example, only the base stations (or a subset thereof) may include GPS receivers. In another example, all modules may include GPS receivers. Then, both RF based location methods and GPS methods may be used in tandem to ensure an accurate location measurement.

An advantageous feature of the present invention is the capability to record the location of the remote modules at a central recording and processing system in near real-time. That is, it is not necessary to travel to each module to extract the location data. Instead, the remote modules, or other location platforms, may be configured to wirelessly transmit the location data back to a central control and recording system. The location data may be transferred across the same network used to transfer the seismic data, or a separate network may be utilized. Moreover, different frequencies, powers, or other signal parameters may be used for the location signals (in relation to the seismic data transfer signals). It will be appreciated that the location of the modules need not be resolved prior to the initiation of seismic data acquisition. Rather, the location can be resolved contemporaneously with or subsequent to seismic data acquisition.

In accordance with a still further aspect of the present invention, module self-locating technologies may be employed that take advantage of the wireless seismic array context to determine location. As noted above, it has been recognized that it is important to provide for the automatic determination of location of the remote data acquisition modules, for example, using RF location techniques, embedded GPS, a combination of the two, or other suitable methods. Generally, determining the precise location of potentially thousands of data acquisition modules is a costly and time-consuming task. First, workers generally travel to each data acquisition module and determine the location using a GPS receiver or a similar device. This requires first that workers know the general location of each module so that it can be found. Once the module is found, it often takes a considerable amount of time for the GPS receiver to provide an accurate location measurement. The location of each device must be entered into a computer system where it will be used when the data is processed. The time spent locating the device, waiting for GPS data, and storing the location data can be substantial. Furthermore, this process may be repeated for thousands of sensors. Therefore, a system that provides for the automated location of the data acquisition modules substantially without contemporaneous human interaction is advantageous. The present invention provides for the automatic locating of at least some of the modules, thus reducing set-up costs. Any suitable self-locating technology can be used in this regard, including GPS location systems built into the modules and capable of wirelessly reporting location.

However, it has been recognized that the wireless nature of the acquisition modules provides additional self-location possibilities. In particular, a number of RF-based location technologies have been developed in connection with wireless telephony and mesh networks. Generally, these technologies involve multilateration (such as triangulation) algorithms using ranging and/or directionality information derived from multiple signals, such as time difference of arrival (TDOA), angle of arrival (AOA), signal strength, etc.

In particular, it has been recognized that these technologies can be adapted to the present wireless data acquisition context. The existing technologies are based on a paradigm involving many mobile handsets and a smaller number of fixed network structures such as wireless network base stations. The goal of these systems is generally to locate the mobile handsets and the locations of the fixed network structures are known. Oftentimes, however, the handsets have limited contact with the fixed structures due to distance, buildings or other obstructions and local topology, resulting in the inability to accurately and timely locate the handsets. Additionally, as the handsets are mobile, the location signals must generally be obtained substantially simultaneously. As a result, in many cases, handsets cannot be located using such technologies or the location is subject to large uncertainties.

This would seem to make such technologies unattractive for locating acquisition modules in the present context, particularly given the accuracy required. However, a number of factors render these technologies viable in this context if properly adapted. First, many RF transmitters can be made available in a close proximity to an acquisition module to be located, thereby allowing for high spatial resolution multilateration algorithms. In addition, if desired, a number of these RF transmitters can be accurately located using GPS or other technologies and can thereby serve as fiducial references to anchor the multilateration calculations. Moreover, the acquisition modules are stationary, allowing for execution of statistical processing over time to reduce uncertainties in the multilateration techniques. The fiducial references can also be located to ensure uninterrupted communication of the RF location signals. It will be appreciated that the location calculations can be performed at the acquisition modules (e.g., based on dedicated location signals or other signals received form multiple transmitters) or at another location (e.g., based on dedicated location signals or other signals transmitted from a module and received at multiple receivers).

Another aspect of the present invention involves a utility for designing a wireless seismic survey using parameters that are unique to wireless seismic survey systems. For example, the layout of the remote data acquisition modules is not constrained by a physical connection between each module, as is the case in a conventional cable-based system. This may enable the system designer to have more freedom when choosing the layout of the modules. For instance, there may be a need to place the modules in a configuration so as to avoid an obstruction. Additionally, parameters relating to the characteristics of wireless transfer may be used to design the wireless seismic survey (e.g., transmit power, number of channels, bandwidth, etc.). As an example, the transmit power and/or the distance between the modules may be increased or decreased to meet the particular survey's objectives. Furthermore, the number of wireless channels required to transfer the seismic data may depend on the spacing of the remote data acquisition modules. Moreover, the number and spacing (density) of acquisition modules may differ, in relation to conventional wired arrays, due to economies associated with the wireless implementation that affect the economic tradeoffs between the cost of the survey and number of sensors. Accordingly, the utility according to the present aspect of the invention involves: obtaining parameter information regarding potential array configurations, wherein the array configurations are a function of the characteristics of wireless data transfer systems; obtaining survey objective information regarding a seismic survey under consideration; and determining an array configuration based on the parameter information and survey objective information.

Yet another aspect of the present invention involves receiving seismic data from a rapid read out (e.g., read out between seismic events) wireless seismic survey system and processing the data into a form that is useful for analyzing the characteristics of one or more subsurface geologic structures. The receiving step may include, for example, transferring the seismic data to a computing system that is capable of processing the data. The processing step may include a number of methods for manipulating the seismic data (e.g., filtering, summing, synchronizing, displaying, normal move out, executing a common mid-point or other gather etc.). It will be appreciated that this may further involve particular processing unique to the wireless context such as deinterleaving of data from the different modules and accounting for unique wireless array geometry. Additionally or alternatively, the processing step may include interpreting the seismic data to identify the characteristics of one or more subsurface geologic structures.

DRAWINGS

For a more complete understanding of the present invention and further advantages thereof, reference is now made to the following detailed description taken in conjunction with the drawings, which are briefly described below.

FIGS. 9A-9C illustrate certain self-locating structure and functionality in accordance with the present invention.

Figure 12A:
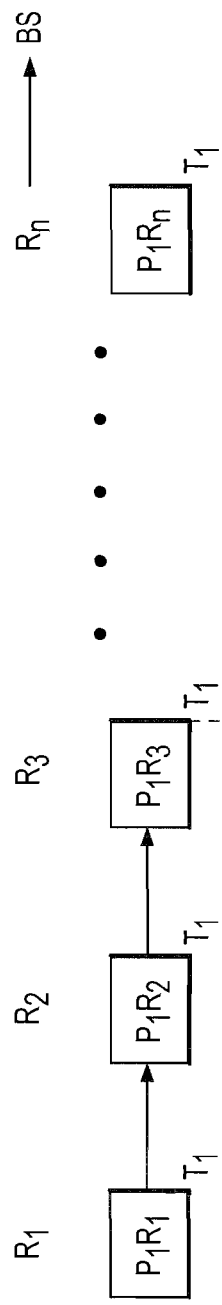
Figure 12B:
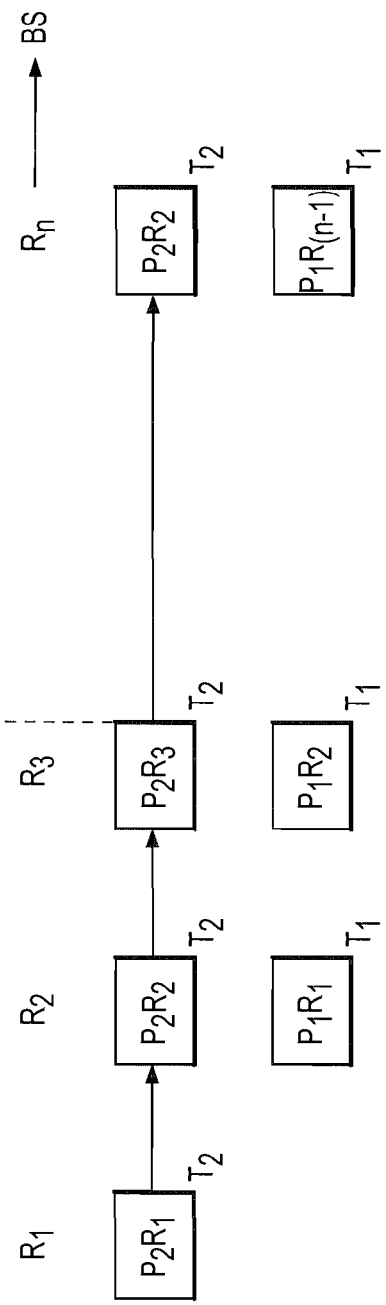
Figure 12C:
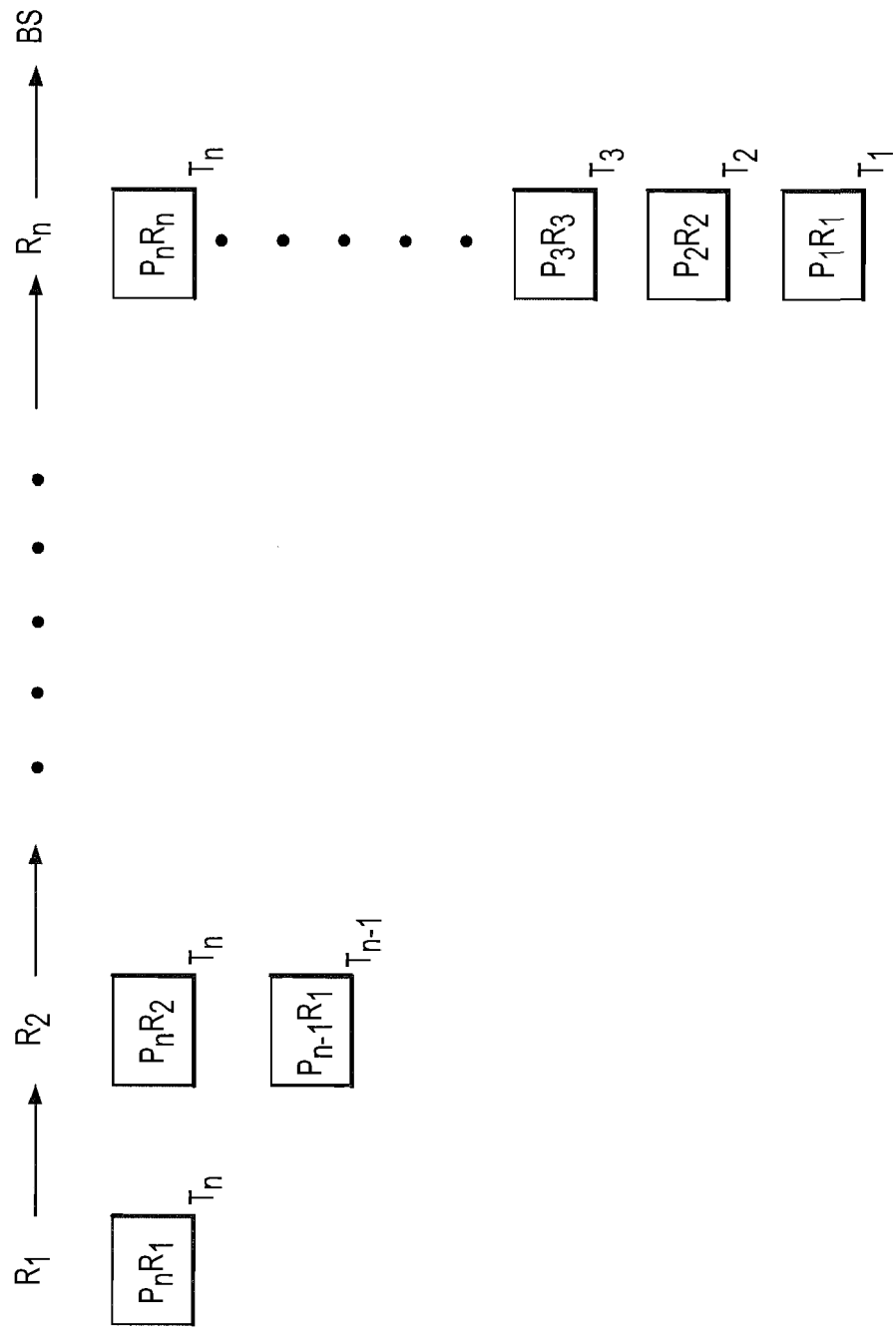

FIGS. 12A-C illustrate a process for transferring data along a serial data transfer path of a wireless seismic array in accordance with the present invention.

DETAILED DESCRIPTION

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

In certain implementations as described below, the present invention combines the data acquisition function and radio relay function into a single module, thus solving a number of problems. Each module typically relays the data to another module en route to the central control and recording system. Some of the advantages of one embodiment of the present invention include:

(a) Because the space between modules is small, typically no more than about 50 meters, relatively low power radios can be used to relay the information to the next module. The savings in power allows the modules to operate for several days on flashlight batteries or even longer on solar cells. Additionally, batteries could be replaced or recharged during scheduled relocation of the modules.

(b) Low-cost, integrated-circuit radio chips are available allowing a design that costs less to manufacture than systems with cables running between modules in a wired system.

(c) Because the array of acquisition modules is laid on the terrain as a mesh, it automatically adapts to uneven terrain. If an obstruction exists, a spare module can be used to pass the signal over or around the obstruction.

(d) If the 2.4 GHz frequency band is chosen, it will be legal in most areas of the world to operate at these low power levels. Because seismic surveys are normally conducted in remote areas, interference from external sources should not be a problem.

(e) By operating the modules on different frequencies within this band, the modules may continuously pass data down a seismic array like a "bucket brigade," providing real time data acquisition and relay to the central control and recording system.

(f) The network may be expanded in scale by adding modules and extending the array to accommodate thousands of modules.

Figure 1:
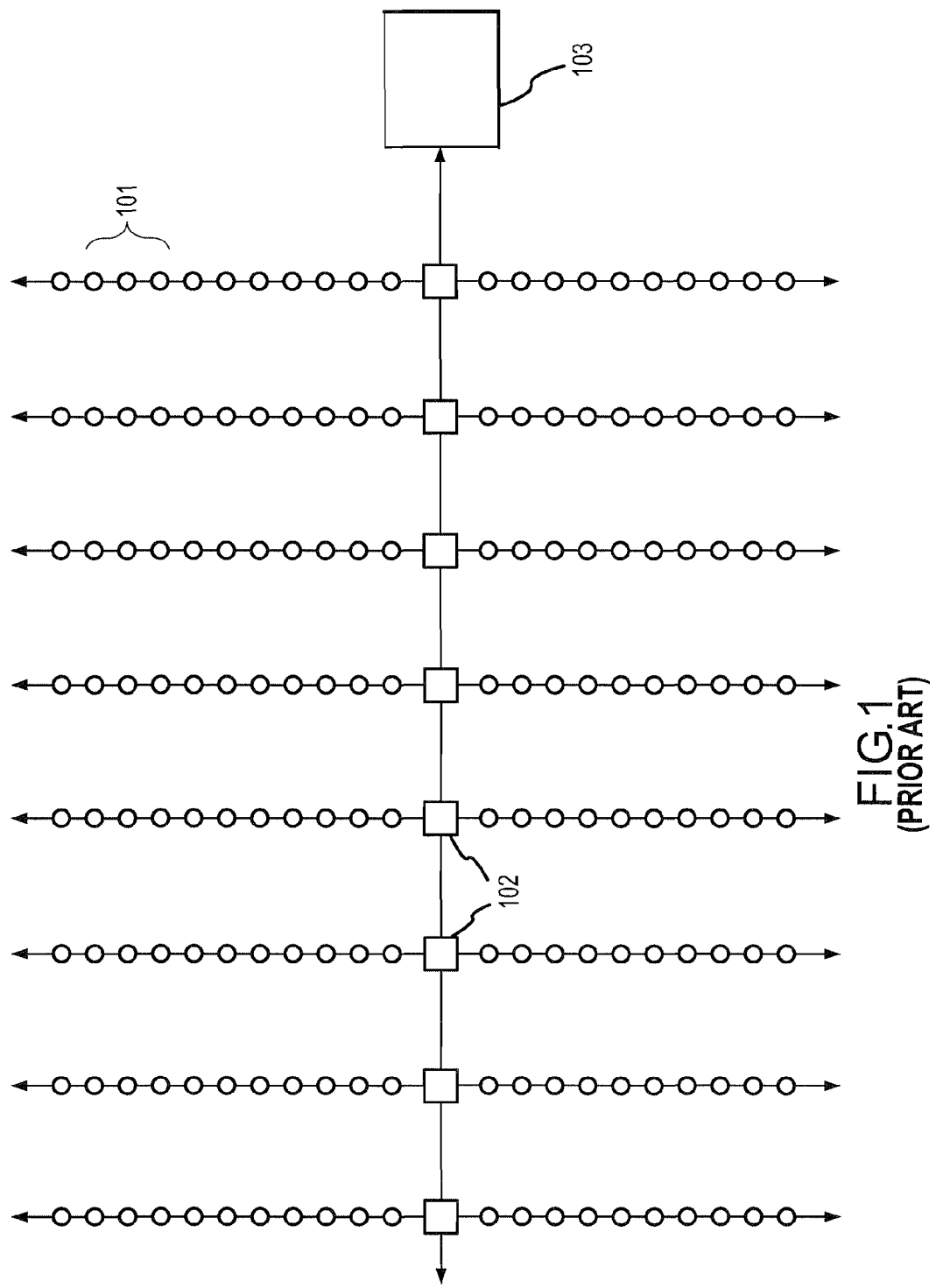
FIG. 1 shows a typical layout of sensors and cables in a wired seismic system.

FIG. 1 depicts a common physical layout of a conventional seismic survey. A number of remote data acquisition modules 101 are connected by cables in a line and arrayed on the ground. Connected to each of the modules is one or more sensors configured as individual sensors, multi-component sensors, or strings of sensors wired into groups. Each of the modules may contain electronics to amplify, digitize, and store the signals from the sensors, or in the case of digital sensors, collect and store the data. The remote data acquisition modules may contain additional circuitry to test the sensors and/or the acquisition circuitry to ensure proper function and performance.

The remote modules are connected together in a line by electrical or fiber optic cables, and the line is connected to a second device called a "line tap" or "crossline unit" 102. The line taps are then connected together in a string, and eventually to a central control and recording system 103.

Seismic data is generally acquired and passed down the cables from the remote data acquisition modules to the line taps, and thence to the central control and recording system. Instructions and timing signals are passed up the cables from the central control and recording system to the line taps and thence to the remote data acquisition modules. Other geometries may be used, including just a linear array. Redundant lines or a ring topology may be used to provide alternate data and control paths in the event of failures or obstructions. The number of sensors deployed may vary considerably depending on the requirements of the survey. If one of the lines must be discontinuous because of some obstruction, such as a river, a radio frequency communication system may be inserted to carry the data and instructions across the gap.

The central control and recording system usually consists of a computer with a display, keyboard, interface to the line tap string, and digital storage system. In one implementation, the central control and recording system might consist of a standard notebook computer with an Ethernet, USB, or wireless interface to connect to a line tap string or to an interface device that connects to the line tap string. Data may be stored on the computer's internal hard disk. For larger systems, the central control and recording system might consist of a larger computer with separate display and keyboard and separate storage device such as a tape drive, one or more hard disks, or some other storage device consistent with storing relatively large amounts of data.

In the present invention, wireless data acquisition and relay modules replace the conventional wired units. The positions of the remote modules might be the same as in a wired system, or the array might be adapted to exploit the flexibility of a wireless system. In the following discussion, a generalized example is first provided to illustrate the flexibility of the present system. That is, the acquisition modules can be arranged in substantially any pattern and serial communications of seismic data can occur along substantially any route in order to report information to a central control and recording system. Thereafter, specific examples are provided that illustrate advantageous array configurations and read out protocols.

Figure 7:
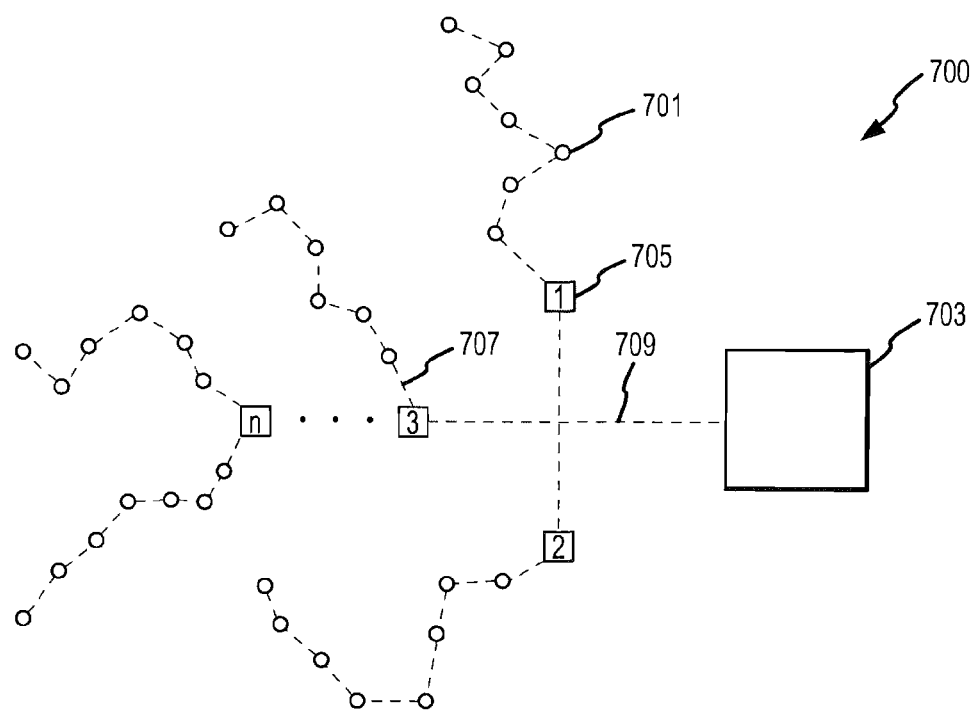
FIG. 7 illustrates a layout of modules in the wireless seismic survey system in accordance with an embodiment of the present invention.

FIG. 7 shows a layout of a wireless seismic survey system 700 in accordance with one embodiment of the present invention. The system 700 includes data acquisition modules 701 which are distributed throughout a seismic survey site. The data acquisition modules 701 are configured to communicate with surrounding modules through wireless links 707. Generally, seismic data is wirelessly forwarded from data acquisition modules 701 that are more remotely located to a central control and recording system 703 to those that are less remote until the data reaches the central control and recording system 703. As shown, the data may be forwarded by the data acquisition modules 701 until it reaches a base station 705. This base station may be capable of transferring and receiving data between the central control and recording system 703 by any suitable method (e.g., Ethernet, USB, fiber-optic link, some computer compatible wireless interface such as IEEE 802.11, etc.). Additionally the base stations 705 may simply be data acquisition modules that are configured to communicate directly with the central control and recording system 703.

FIG. 7 illustrates that the layout of the data acquisition modules need not be a linear array, or any regular geometric configuration. This is advantageous because it allows the survey system to operate around obstructions, and allows freedom for survey designers to choose a layout that will optimize the performance of the system.

It will be appreciated that the data path of the seismic data between the data acquisition modules may be manually or automatically configured. In the former case, each module may be programmed, for example, to communicate with predetermined modules that will be placed immediately or closely adjacent to each other. Alternatively, the modules may be configured to automatically detect and select an optimal path for the seismic data to be transferred. In this latter case, the modules may be positioned without needing to place particular modules in particular locations. Then, the modules may select an optimal data path based on various factors such as obstructions, signal strength, transfer rates, etc.

An important aspect of the present invention is the capability to provide for rapid capture of data from a wireless array. That is, the system can operate more efficiently and inexpensively if the data capture can be accomplished without delaying the survey process, as described hereinabove. In order to achieve this goal, it will be appreciated that the seismic data needs to either be stored locally (e.g., at a module base station or other collection station), in whole or in part, for the entire survey, or otherwise transferred to a central control and recording system in a manner which does not interfere with or delay the operation of the vibration source device. The present invention provides a system for wireless transfer of seismic data which achieves this goal. In one embodiment of the present invention, all of the seismic data for a seismic event is transferred from the data acquisition modules to the central control and recording system, or other storage system, in no more than about 20 seconds, from the end of the vibration event. This is achieved by selecting data transfer rates, the number of data acquisition modules in the array and in each serial data transfer line, and other factors. An example of a preferred embodiment is described in detail below.

Figure 2:
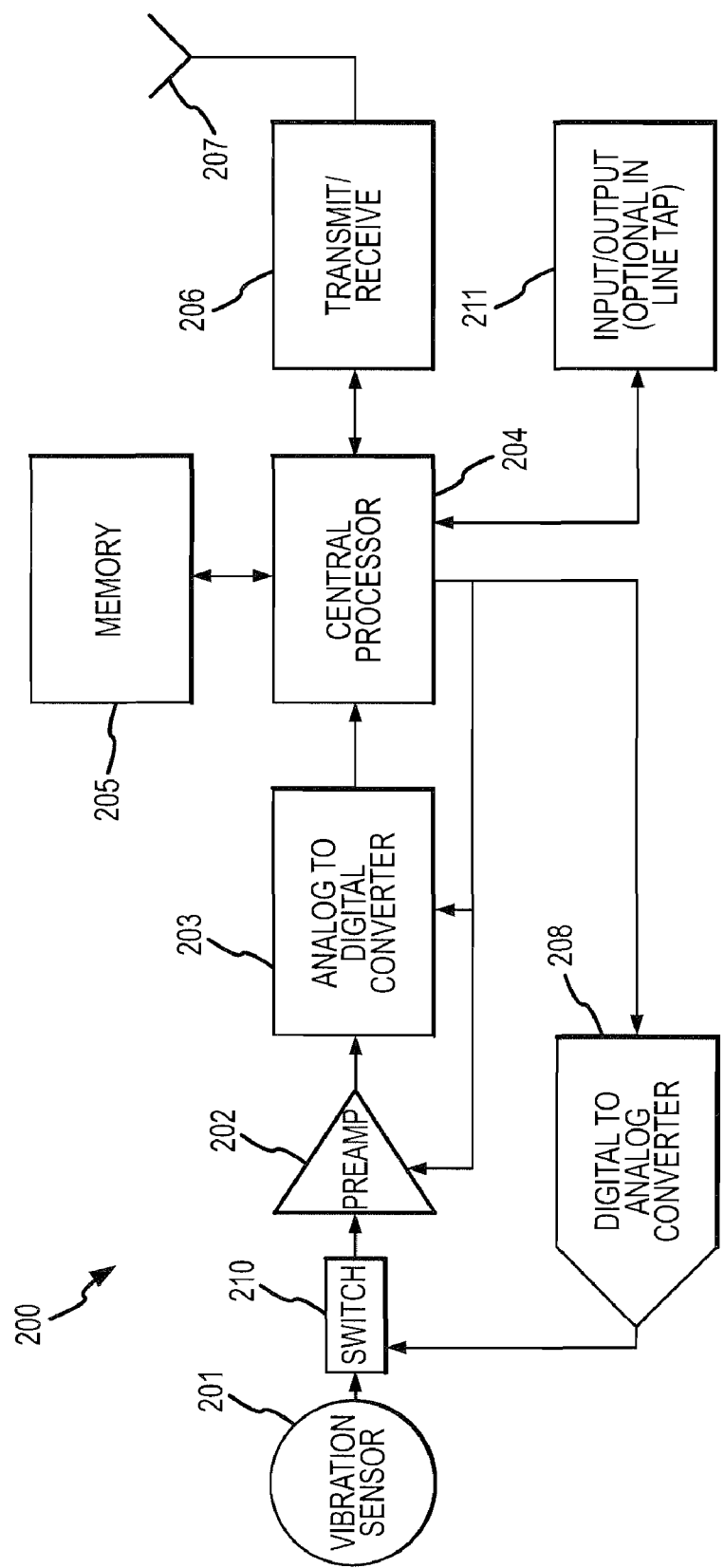
FIG. 2 is a block diagram of the remote data acquisition and relay module in accordance with an embodiment of the present invention.

FIG. 2 shows a block diagram of a wireless remote acquisition and relay module 200 in accordance with an embodiment of the present invention. A vibration sensor 201 converts vibrations into electrical signals which are fed through switch 210 to preamplifier 202 and thence to the analog to digital (A/D) converter 203. The digital data from the A/D converter 203 is fed into the Central Processor 204 or directly into a digital memory 205. Alternately, in the case of a sensor 201 with direct digital output, the signals may flow directly to the processor 204 or memory 205.

In addition to controlling the system and storing the data in the memory, the processor 204 may perform some calculations on the data including decimation, filtering, stacking repetitive records, correlation, timing, etc. The remote module 200 may also receive information through the transceiver 206, for example: timing information, cross-correlation reference signals, acquisition parameters, test and programming instructions, location information, seismic data from upstream modules and updates to the software among other commands. The transmit and receive signals couple through antenna 207.

The processor 204 can control the transceiver 206, including transmit/receive status, frequencies, power output, and data flow as well as other functions required for operation. The remote module 200 can also receive data and commands from another remote module or base station, store them in the memory, and then transmit them again for reception by another remote module up or down the line.

A digital-to-analog (D/A) converter 208 may be included in the system which can accept digital data from the processor 204 to apply signals through a switch 210 to the input circuitry. These signals, which may for example consist of DC voltages, currents, or sine waves, can be digitized and analyzed to determine if the system is functioning properly and meeting its performance specifications. Typical analysis might include input noise, harmonic distortion, dynamic range, DC offset, and other tests or measurements. Signals may also be fed to the sensor 201 to determine such parameters as resistance, leakage, sensitivity, damping and natural frequency. The power supply voltage may also be connected through the switch 210 to the A/D converter 203 to monitor battery charge and/or system power. The preamplifier 202 may have adjustable gain set by the processor 204 or other means to adjust for input signal levels. The vibration sensor 201 may be a separate generic unit external to the remote module 200 and connected by cables, or the sensor 201 might be integral to the remote module package.

If the remote module 200 is to be used as a base station, equivalent to a "line-tap" or interface to the central recording system, it will also have a digital input/output function 211 which may be, for example, an Ethernet, USB, fiber-optic link, or some computer compatible wireless interface (e.g., one of the IEEE 802.11 standards) or another means of communication through a wired or radio link. It may be acceptable to use larger battery packs for the line tap wireless data acquisition and relay modules because they will normally be relatively few in number and may communicate over greater distances using a high speed data communication protocol.

The remote module 200 is constructed of common integrated circuits available from a number of vendors. The Transmit/Receive integrated circuit 206 could be a digital data transceiver with programmable functions including power output, timing, frequency of operation, bandwidth, and other necessary functions. The operating frequency band may preferably be a frequency range which allows for unlicensed operation worldwide, for example, the 2.4 GHz range. The Central Processor 204, Memory 205, and switch 210 can include any of a number of generic parts widely available. The A/D converter 203 could preferably be a 24-bit sigma delta converter such as those available from a number of vendors. The preamplifier 202 should preferably be a low-noise, differential input amplifier available from a number of sources, or alternatively integrated with the A/D converter 203. The D/A converter 208 should preferably be a very low distortion unit which is capable of producing low-distortion sine waves which can be used by the system to conduct harmonic distortion tests. The module 200 may include a number of other components not shown in FIG. 2, such as a directional antennae for AOA signal measurements, separate transmit and receive antennae, separate antennae for location signals and seismic data transfer signals, GPS receivers, batteries, etc.

The following example depicts how the system can acquire seismic data continuously. Assume that every module is sampling the vibration signals at 500 samples per second with a resolution of 24 bits per sample. The seismic data from the vibration sensor is digitized and stored in memory. While this is taking place, the transceiver 206 is receiving data from the next module more remotely located to the central recording system. After some amount of data is collected from the sensor 201 and the other modules, the module switches to transmit mode and sends some packets of data collected from the sensor 201 and the other modules on towards a module closer to the central recording system. Each packet of data is also annotated with some identification as to the original source sensor and the time acquired. The module continues to acquire and store data during the transmit phase so there are no gaps in the record.

The time stamp annotation may come from a clock in the microprocessor or the radio. The clocks in all the modules may be periodically adjusted and synchronized with a signal from the central recording system or other source.

Figure 3:
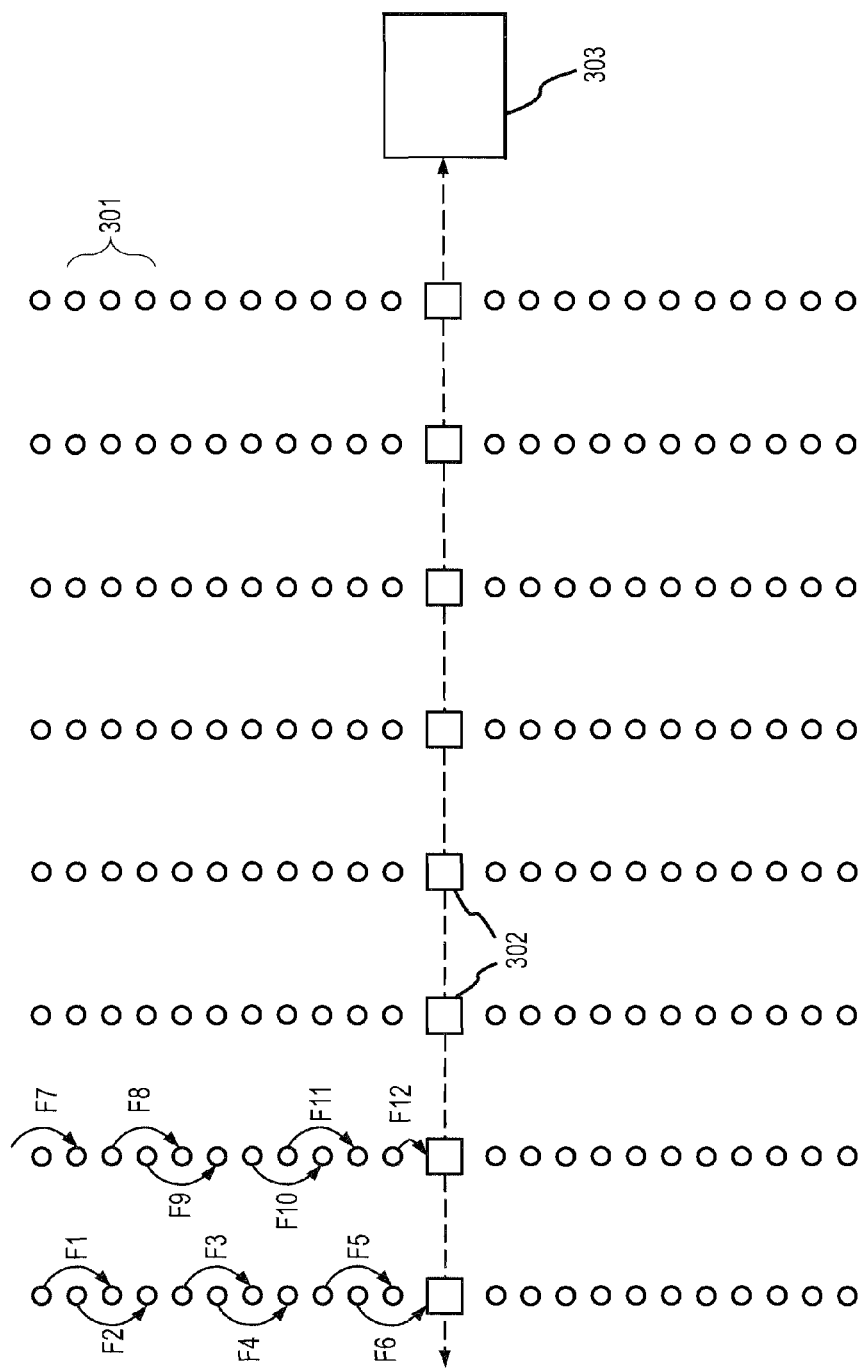
FIG. 3 is a typical layout of modules and sensors in the wireless system in accordance with an embodiment of the present invention.

FIG. 3 shows one possible configuration of a wireless seismic system in accordance with an embodiment of the present invention. A number of remote modules 301 may be arranged in lines as is done with a wired system as shown in FIG. 1, except that there is no physical connection between the remote modules. Replacing the line-tap modules are base station modules 302 which may be connected to a central control and recording system 303 by Ethernet, fiber optic, or other digital data link or a wireless substitute. Example radio links operating on frequencies F1 to F12 are indicated by arrows. Note that for improved data rate, each radio link in the illustrated embodiment leaps past the nearest remote module to the next module closer to the base station. Other radio transmission paths are possible, including direct to the nearest remote module, leaping multiple modules, or in the case of an obstruction or equipment fault, past a defective remote module or even across to another line or any other logical path that establishes a communication flow. The central control and recording system may be a notebook computer or larger equivalent system.

Figure 4:
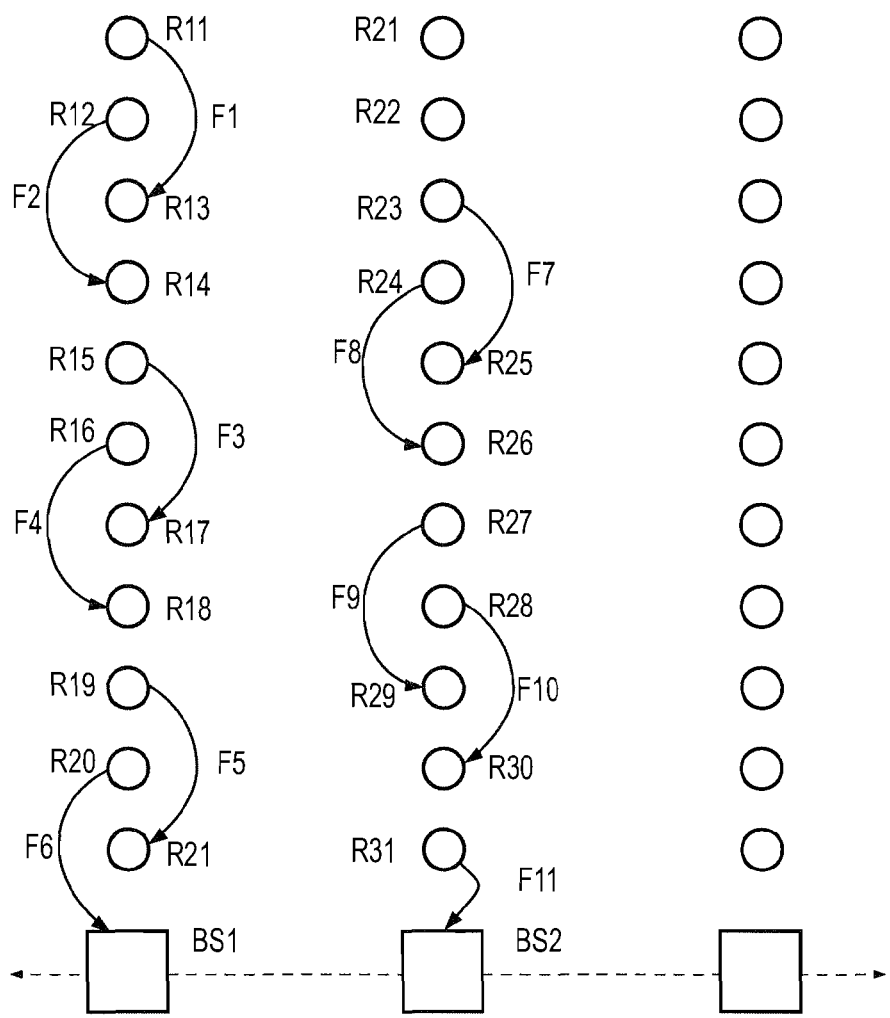
FIG. 4 is a detailed drawing of a portion of the wireless system use to discuss frequency allocation and operation in accordance with an embodiment of the present invention.
Figure 4:
Figure 4:

FIG. 4 is an exploded view of a portion of the line representative of an array of wireless remote modules Rn and base stations BSn connected together by an Ethernet or Fiber Optic or radio frequency wireless or other link in accordance with an embodiment of the present invention. During the data acquisition phase, signals from the sensors will be digitized and stored in memory. Some of the remote modules will then transmit digital data from the memory through the RF link. Others will be receiving digital data from nearby modules, temporarily storing data in memory. At maximum data transmission rate, half the remote modules may be transmitting and half would be receiving at any time. So that the modules don't interfere with one another, different frequencies may be assigned to each remote module within range of any other remote module. For example, remote module R11 will transmit on frequency F1 to remote module R13. Remote module R12 can simultaneously transmit on frequency F2 to remote module R14. Remote modules R15, R16, R19 and R20 are also transmitting on their assigned frequencies F3, F4, F5, and F6, respectively. Remote module R20 sends its data packet to its base station BS1. After the data packets are passed between the remote modules, the transmit/receive states of the remote modules is reversed, as illustrated in the drawing by the next string of remotes. Remote module R23 transmits its data packet on frequency F7 and the process continues, with remote module R31 transmitting its packet to base station BS2. Data is further transmitted down the backbone data link to the central recording and control system.

It will thus be appreciated that the signals used by the modules are time-division multiplexed and frequency division multiplexed. That is, as noted, modules within receiving range of one another that transmit during the same time intervals may be assigned different transmission frequency bands to avoid interference. Thus, different modules within receiving range of one another and even within a single serial data transfer path (e.g., the path defined by R11, R13, R15, R17, R19, R21, BS1 in FIG. 4) can transmit concurrently, thereby enhancing read out rates.

In addition, as noted above, any particular module may transmit only half of the time or less. For example, a module may transmit data substantially half of the time and receive data from an upstream module or modules substantially half of the time. Thus, within a given serial data transfer path, adjacent modules will typically transmit in opposite (i.e., alternating) time intervals. Signals from adjacent modules will therefore generally be time division multiplexed. As such, a given frequency band can be re-used by modules within receiving range of one another or even within a given serial data transfer path, thereby resulting in better use of the available data channels, which may allow for greater density of the array (closer spacing of the modules) as may be desired.

Moreover, it will be noted that each physical line of modules in FIG. 4 is, in effect, defined by two (in the example of FIG. 4) or more interleaved serial data transfer paths. That is, the even number modules associated with base station BS1 (R12 . . . R20) define one serial data transfer path and the odd number modules (R11 . . . R21) define another. These two serial data transfer paths may be coordinated so as to improve data read out. For example, these serial data transfer paths may be synchronized so that modules R20 and R21 alternately transmit to base station BS1. In this manner, resources are used more effectively as a single antenna at base station BS1, operating with a substantially 100% duty cycle, can receive the signals from R20 and R21. Alternatively, base station BS1 can receive signals from spatially separated lines to make a similarly effective use of resources. Although not shown in FIG. 4, the base stations BS1 , BS2, etc., may receive data from separate lines, e.g., on opposite sides of the base stations.

It will be appreciated that the advantages of multiple multiplexing techniques (e.g., time and frequency multiplexing) may be realized in a variety of ways. For example, rather than having the operation of a given module be divided into two substantially equal intervals defining a cycle period (e.g., a receive interval followed immediately by a transmit interval), the cycle period may be divided into more than two intervals. For example, a module may receive data from a first upstream module during a first interval, receive data from a second upstream module in a second interval and transmit data (obtained at the module and/or received from the first and/or second upstream modules) in a third interval. For example, such a three interval cycle may be used in connection with a nonlinear, serial data transfer layout. Alternatively, a three interval cycle may be used in connection with interleaving three serial data transfer paths in a single physical line of modules as may be desired.

Moreover, in some cases, modules may operate at less than a 100% duty cycle with respect to wireless data reception and transmission, i.e., with quiet intervals within a cycle period where the module is neither transmitting nor receiving. For example, the cycle may be divided into four intervals, and odd numbered modules may receive in the first interval, transmit in the third interval and neither transmit nor receive in the second and fourth intervals. Even numbered modules may receive in the second interval, transmit in the fourth interval and neither transmit nor receive in the first and third intervals. This provides a further dimension of time division multiplexing as between the interleaved serial data transmission lines as may be desired, for example, where efficient use of bandwidth is more critical than full-duty-cycle usage of any individual antenna.

Multiplexing technologies other than time-division and frequency division multiplexing may also be used, for example, code division multiplexing. In code division multiplexing, a transmitter-receiver pair are assigned a digital code that enables a signal of interest to be distinguished from other signals even where the other signals overlap the signal of interest in time and frequency. The codes of potentially interfering signals may be selected to be mathematically orthogonal so as to reduce interference. In the case of applications involving many potentially interfering signals, long codes may be utilized, thereby potentially complicating processing and increasing overhead. In the present context, where low power transmissions and a well-defined array geometry are employed, shorter codes may suffice. Moreover, code division multiplexing may be combined with time division and/or frequency division multiplexing as discussed above to further shorten codes and optimize processing. Additionally, depending on economic considerations amount other things, multiple antennae, for example, separate transmit and receive antennae, may be employed for a given module.

In the example of FIG. 4, which involves a sampling rate of 500 samples per second and a sampling resolution of 24 bits, remote module R11, transmitting half the time, must transmit data at 24000 bits per second to remote module R13, which is currently acquiring data from its own sensor at the 12000 bits per second rate. After some elapsed time, the remote modules all switch between transmitting and receiving status, and pass the data further down toward the base station. Now, remote module R13 will pass the data previously received from R11, plus its own accumulated data to remote module R15. Since it now needs to pass data from two sensors, the data rate will have to be 48000 samples per second in order to prevent a backlog of data at the sensors. It will be appreciated that data originating form different modules, even though it is subsequently transferred in a single transmission interval, may have a slightly different reference time or time stamp as will be discussed in more detail below. Appropriate header or metadata may be associated with the data to not only identify the source module/location, but also to identify the acquisition time.

The required data rate will increase in a linear fashion as the line of remote modules grows longer. When the number of stations in a line multiplied by the sample rate times two exceeds the maximum data rate of the wireless data acquisition and relay modules, the line will no longer be able to do keep up with the data flow. At that point, it will be necessary to add another line of base stations, or to allow delays in the data transmission process, or allow "wait periods." In the case of a vibrating energy source, this would mean expanding the system components or stopping the energy source for the necessary delay. That is, in some cases, data may be stored at one or more of the modules or base stations for read out during repositioning of the energy source or at another time without delaying the survey process. Another option would be to correlate and/or stack the pilot signal from the vibrating energy source in the remote modules using the central processor, which greatly reduces the amount of data required. Yet another option would be to use data compression to reduce the number of data bits required to carry the information, which would allow the system to have more remote modules per base station. When an explosive source is used to generate the vibration, the amount of seismic data collected in a time period is much less, so arrays could be much larger than surveys that use a vibrating energy source vehicle.

Each data packet from each remote module may contain information on the time the data was collected, acquisition parameters, index number and serial number of the remote module, station coordinates, etc. Periodically, commands and information may be sent up or down the line to the remote modules (e.g., time synchronization, acquisition parameters, self-test instructions, etc.). The base station modules may contain circuitry from multiple modules to allow data transmission to two or more arrays in the same or different directions.

FIGS. 12A-12C graphically illustrate the serial transfer of seismic data packets from a series of modules R1-Rn to a base station BS. As illustrated, each module R1-Rn generates a data packet $P1R_{(1-n)}$ in response to at least a portion of a seismic event. The data in each packet $P1R_{(1-n)}$ is collected for a first time period T1. The first packet for each unit is then transmitted to another module disposed along the serial data transfer path nearer to the base station BS. The process is repeated for a second time period T2. However, it will be noted that the second module R2, in addition to generating a second data packet P2R2 for the second time period T2, also is in receipt of the first packet P1R1 for the first time period as received from the first module. See FIG. 12B. The first data packet P1R1 may be appended to the second data packet P2R2 for transfer to the third module R3 during the next transmission period. In this regard, the data file transferred by the second module R2 to R3 will include packets P1R1 and P2R2 from different modules (i.e., modules R1 and R2). Further, these packets P1R1 and P2R2 will contain seismic data that is collected during two separate time periods T1 and T2.

It will be appreciated that as the number of time periods increases, the number of data packets transferred by the last remote unit Rn to the base unit BS may equal the number of remote units in the serial transfer path. For instance, the last module Rn may include a data packet from each module unit R(1-n). Further, each of these data packets may include data for a different time period T(1-n). Accordingly, prior to utilizing the packets from the module R(1-n), those packets will be correlated and reassembled. For instance the packets associated with the first module RI (e.g., $P1R1_{T_1}$-$PnR1_{T_n}$) may be collated from multiple data files that were transmitted to the base station BS. The collated packets may be reassembled in temporal order to define a response of the first module R1 to a seismic event. Of note, such collation and/or reassembly may be performed by the base station, by the central control or at a location remote from the seismic survey. In the latter regard, such collation and/or reassembly may be performed after the seismic survey is completed.

Frequencies are assigned to the modules in such a manner as to avoid interference with other modules. Such assignment may depend the on known location and separation of the modules, or may be based on automatic field tests where actual experiments are conducted manually or automatically by the central computer. Alternatively, the individual modules might be instructed to conduct their own tests to determine the best frequency allocation. In the case of weak signal strength, the modules might adjust their power output to the level necessary consistent with minimum use of battery power. In the event of an obstruction such as a ridge line, structure, or other problem with radio communication, one or more extra modules may be placed to maintain data flow by acting as a radio relay. The extra module may or may not contain a vibration sensor.

Data acquisition, the digitization of data from the sensors, and radio transmission of previously acquired data will occur simultaneously so there will be a small delay between acquisition and transmission. Accordingly, each packet of data may include information on the source and time of acquisition. The data packets will be reassembled into a file with records from all the sensors comprising the active portion of the array.

Figure 8:
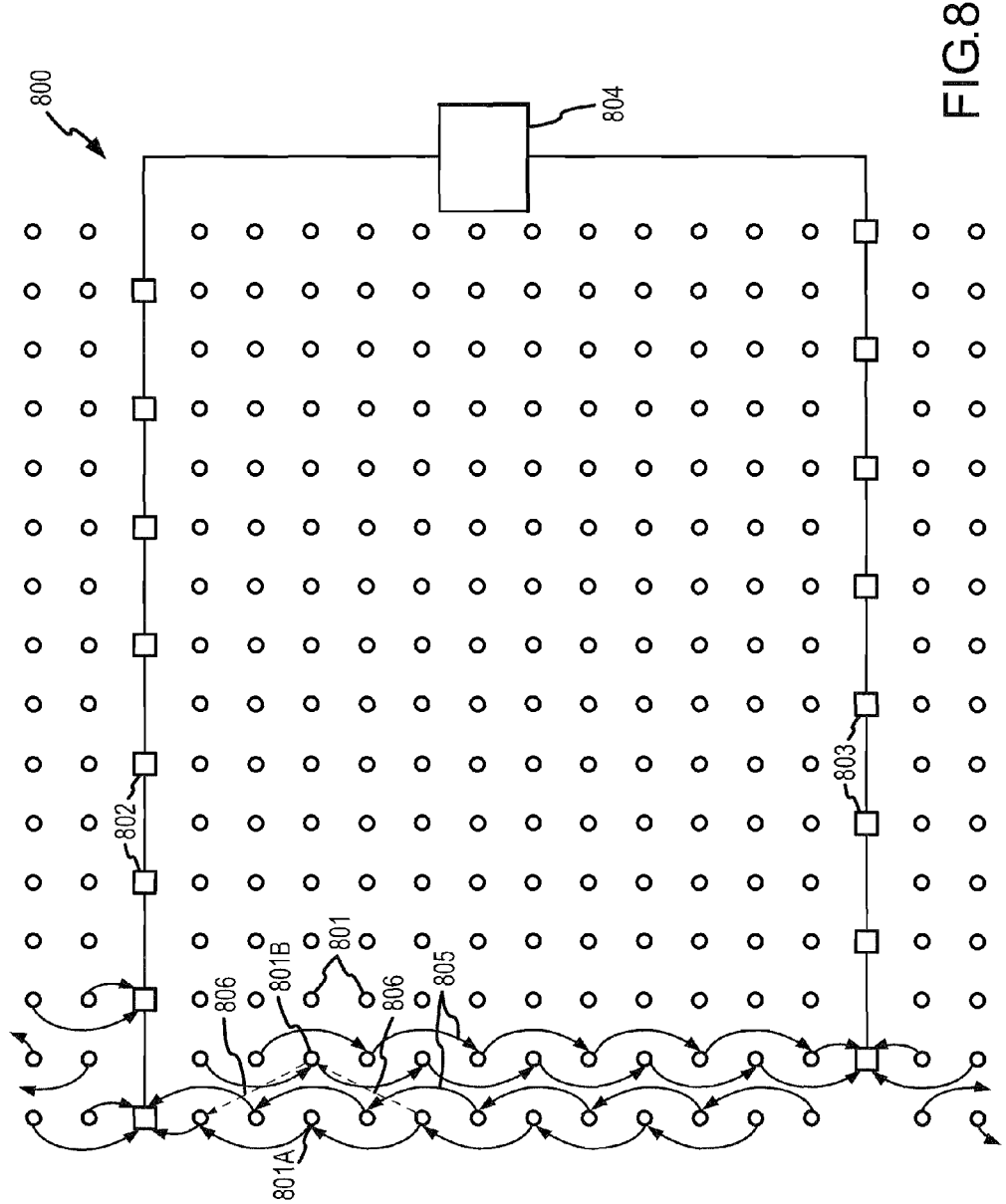
FIG. 8 illustrates an alternative layout of the seismic array and an associated read out protocol in accordance with the present invention.

It will be appreciated that many variations of the systems of FIGS. 3 and 4 are possible. One such system 800 is illustrated in FIG. 8. The illustrated system 800 includes a generally rectilinear array of acquisition modules 801 generally similar to that of the systems of FIGS. 3 and 4. However, the illustrated system 800 includes multiple rows of base station modules, including a row of first base station modules 802 and a row of second base station modules 803. As discussed above, a column of acquisition modules 801 transfers data in serial fashion to a base station 802 or 803. In this case, alternate columns of acquisition modules 801 transfer data to opposite base stations 802 or 803, as indicated by arrows 805. That is, if a given column transfers data to a first base station 802, adjacent columns on either side thereof transfer data to a second base station 803. There are various array design reasons why the array might be implemented in this fashion. For example, if a given data acquisition unit 801A is defective or otherwise off-line, data may be transferred around that module 801A by using a module 801B of an adjacent column, as indicated by dashed lines 806. For example, this may be implemented by appropriately adjusting the transmit and/or frequencies of the relevant modules 801. In this regard, having adjacent columns read out in opposite directions is convenient so as to avoid the need to transfer undue amounts of data. That is, as noted above, the amount of data transferred increases as you approach a base station in any column due to the serial data transfer protocol. In the illustrated case, modules 801 close to a base station are proximate to modules 801 in an adjacent column that are remote from their respective base stations. Accordingly, it will generally be possible to use a module 801B from an adjacent column as illustrated to bypass a defective module 801A without overloading the bypass module 801B. In this case, each module receiving data from bypass module 801B may only re-transmit data relevant to its serial data transmission line.

The illustrated base stations 802 and 803 transfer data to a central control and recording system 804 generally as described above. Also, as illustrated in FIG. 8, the base stations 802 and 803 may receive information from modules 801 on either side thereof. For example, each of the base stations 802 or 803 may have a pair of receivers for receiving data from modules 801 on opposite sides thereof.

Figure 5:
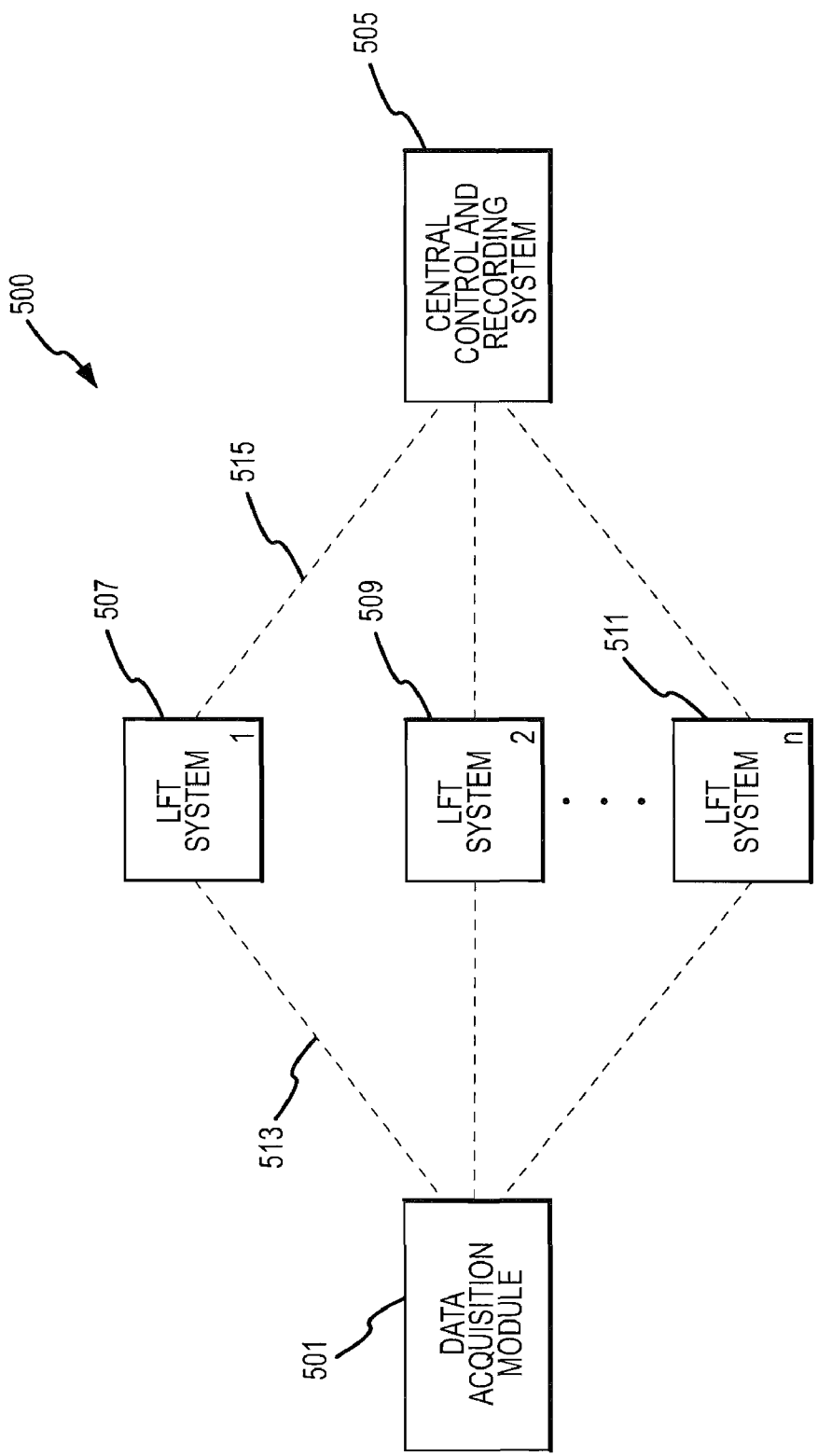
FIG. 5 illustrates a system for automatically determining the location of data acquisition modules.

Turning now to FIG. 5, the wireless survey system 500 may provide for the automatic determination of the location of the data acquisition modules. As shown, the system may utilize one or more Location Finding Technology (LFT) systems 507, 509, 511 to determine the location of a data acquisition module 501. These LFT systems may employ a number of location finding technologies such as AOA, TDOA, GPS, signal strength or other methods. Examples of such systems include infrastructure-based systems such as AOA, TDOA and signal strength, external systems such as GPS, and hybrid systems such as infrastructure assisted GPS. Generally, an infrastructure-based system may determine the location of a data acquisition module based on communications between the data acquisition module and other wireless location units (WLUs) (e.g., dedicated LFT units, other data acquisition modules, etc.). For example, and as will be described in more detail below, such systems may receive information concerning a directional bearing of the data acquisition module or a distance of the module relative to one or more other WLUs. Based on such information, the location of the data acquisition module may be determined by triangulation or similar geometric/mathematic techniques. External systems such as GPS systems, typically determine the location of the data acquisition module relative to an external system (e.g., a GPS satellite constellation). This is accomplished by equipping the data acquisition module with a GPS receiver.

Normally, the output from the LFT systems will be transferred to a central control and processing system 505. The nature of the output and the method of data transfer are described in more detail below. Generally, the output will include the location of one or more data acquisition modules, and will be used by a data processor to process the seismic data into a format that can be analyzed.

Figure 6A:
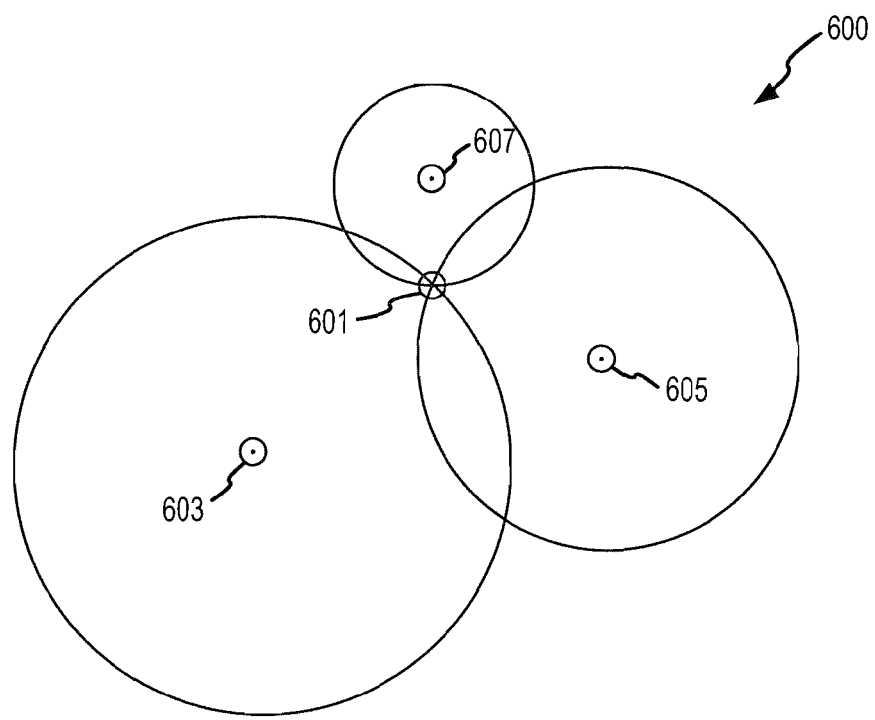
FIGS. 6A-6C illustrate the operation of various technologies that can be used to automatically locate the data acquisition modules.
Figure 6B:
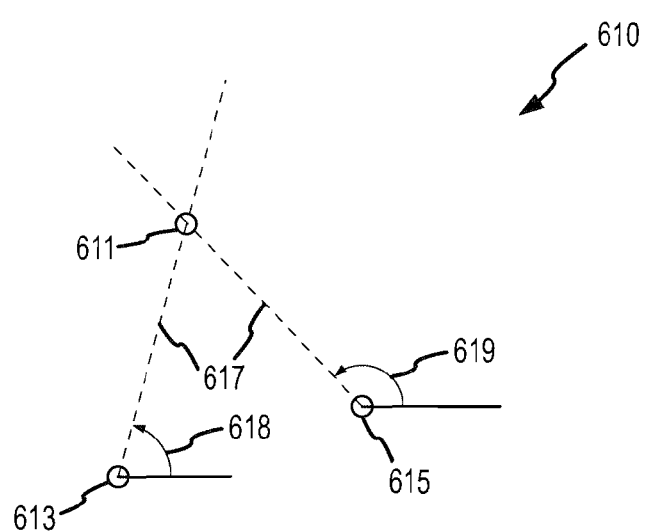
Figure 6C:
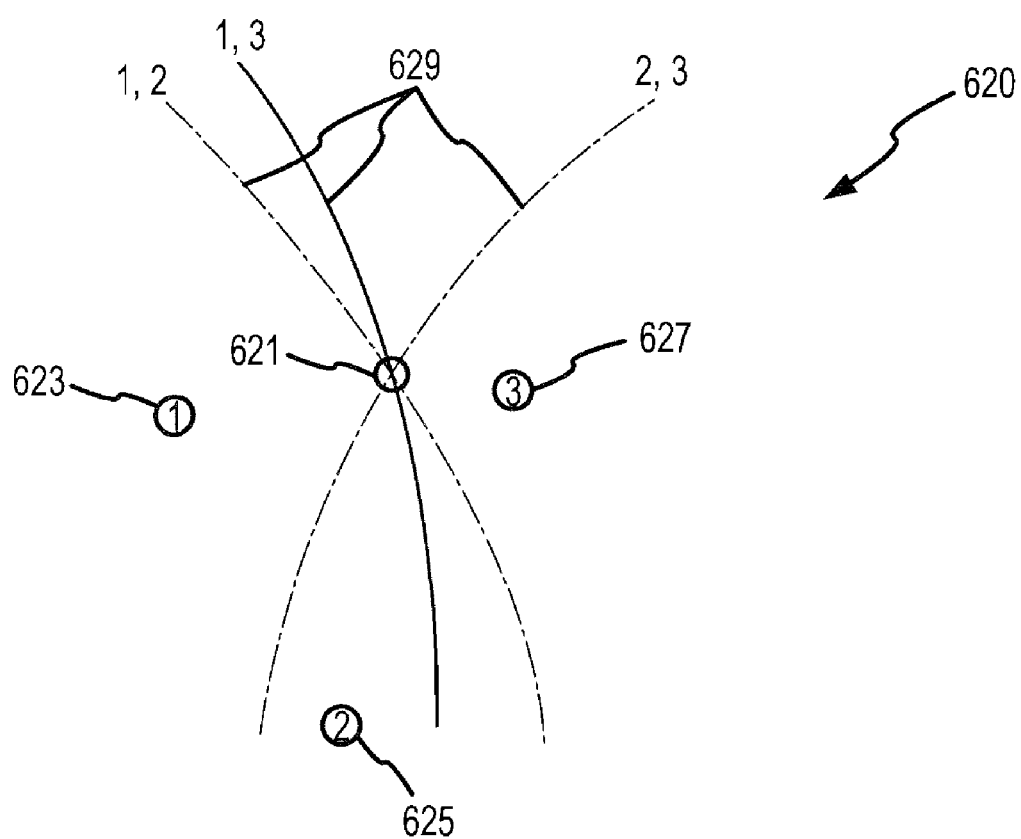

For purposes of illustration, a number of different location finding technologies are depicted in FIGS. 6A-6C. FIG. 6A depicts time of arrival (TOA) based LFT 600. In this case, the range between a first data acquisition module 601 and another WLU 603 is determined, based on time of signal arrival or signal transmit time of a signal from a data acquisition module to another WLU. Once the range between the data acquisition module and at least three other WLUs 603, 605, 607 is known, the relative position of the first data acquisition module 601 can be determined by resolving the intersection of the ranges.

FIG. 6B generally illustrates an AOA based LFT system 610. AOA based LFT systems may determine the location of a first data acquisition module 611 based on the angle of arrival of signals 618, 619, generally indicated by dashed lines 617, from the first data acquisition module as measured by two or more WLUs 613 and 615 which are equipped with antennas capable of resolving the angle of arrival of a signal, such as multiple directional antennas (not shown). It will be appreciated that modules may therefore be equipped with specialized antennae for this purpose. The various angles of arrival can be used to calculate the location of the first data acquisition module 611 based on the intersection of angles from two or more WLUs.

FIG. 6C illustrates a TDOA based LFT system 620. In TDOA systems, multiple WLUs 623, 625, 627 measure the time of arrival of signals from a first data acquisition module 621. Based on such measurements, the difference of the time of arrival between two WLUs can provide information regarding the first data acquisition module's location in terms of a hyperbola 629. The intersection of three or more of the hyperbolas 629 can be used to determine the location of the first data acquisition module 621.

It will be appreciated that some of the methods described above provide a relative location of a data acquisition module, that is, a location relative to one or more WLUs. In order to translate the relative location of the data acquisition module into an absolute one, the absolute location of at least one WLU may be predetermined. This can be accomplished using several methods. For example, one or more of the WLUs may be equipped with a GPS receiver. As another example, the location of one or more WLUs may be determined by any suitable method, and the location of the one or more WLUs may be used to translate the relative location into an absolute location.

Additionally, it is noted that the WLUs may be provided as any of a number of suitable devices. As an example, in a preferred embodiment the WLUs may include other data acquisition modules and/or base stations. In this embodiment, the data acquisition modules would be configured to receive signals from (or transmit signals to) surrounding data acquisition modules (or base stations) for the purpose of automatic location. Alternatively, the WLUs may include receivers that are dedicated to the function of locating the data acquisition modules.

It will be appreciated that the control and processing of the automatic location system may be performed at the central control and recording system, or remotely. In one embodiment, the central control and recording system may send a command to a first data acquisition module, directing it to start the automatic location procedure. This command may be transferred in the same manner that the seismic data is transferred, or alternatively, may use a separate data transfer method. In other words, the data transfer structure for the automatic location system may or may not be the same as is used for the transfer of seismic data. Next the first data acquisition module, or a separate control platform, may wirelessly send a command to surrounding data acquisition modules indicating that they should prepare to receive a signal. Then the first data acquisition module may transmit a signal, and the surrounding modules would receive it. The surrounding modules may then transfer the raw data (which may include identification, timing information, angles of arrival, geographic coordinates, etc.) or processed information back to the central control and recording system using a suitable data transfer method. In the case of raw data, the central control and recording system may then use the information from the surrounding modules to calculate the location of the first data acquisition module using one or more of the methods described herein. Alternatively, the logic to perform the location calculations may be included in the WLUs, or another suitable system. In the latter case, the WLUs may send processed data that includes the location of one or more data acquisition modules back to the central control and recording system.

As noted above, the system of the present invention can utilize a variety of multilateration technologies that have been developed in connection with wireless telephony and mesh networks. However, the system of the present invention takes advantage of the seismic array context to optimize these positioning technologies. In this regard, an exemplary seismic array 900 is illustrated in FIG. 9A. The array 900 includes a number of acquisition modules 901. At least one of the acquisition modules 901A is self-locating, in this case, using an RF technology such as TDOA or signal strength. Such multilateration technologies involve communication between the module to be located 901A and multiple reference structures. For example, the multiple reference structures may transmit signals to the module to be located 901A and/or the module 901A may communicate signals to the reference structures. In this case, the reference structures may be other acquisition modules 901B or dedicated reference structures 901C. For example, it may be convenient to have some or all of the base stations 902 function as the reference structures 901C. Similarly, the signals used for location purposes may be dedicated location signals or may be data transfer signals including encoded information that can be used for positioning purposes.

In the illustrated example, the module 901A receives positioning signals from a number of other acquisition modules 901B. In this regard, the module 901A may receive positioning signals from more than the minimum number of modules 901B required for three-dimensional positioning in order to enhance positioning accuracy. Because the module 901A is stationary, it is not necessary that the various positioning signals be received at the same time. Thus, for example, the module 901A may include an antenna that can be tuned to different frequencies at different times so as to receive positioning signals from different modules 901B. Alternatively, the modules 901B may transmit positioning signals at a designated frequency for module 901A. The transmitting structures 901C, which may be other modules or base stations, may use a higher transmission power for location signals than for seismic data transfer signals so as to provide a longer transmission range. As less location signals than seismic data transfer signals will generally be used, this can be done without undue depletion of batteries. It will thus be appreciated that the illustrated positioning system has a number of advantages in relation to wireless telephony positioning systems due to the array configuration and stationary nature of the array.

Figure 9B:
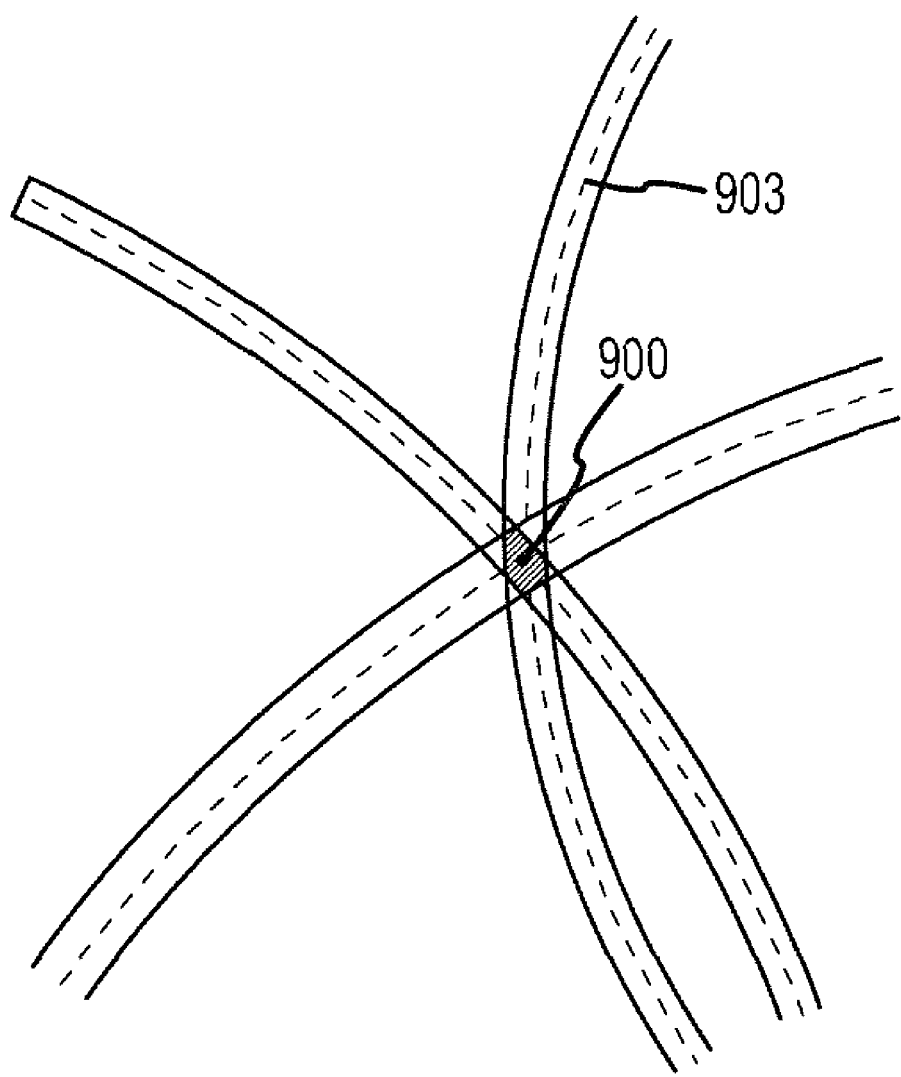
Figure 9C:
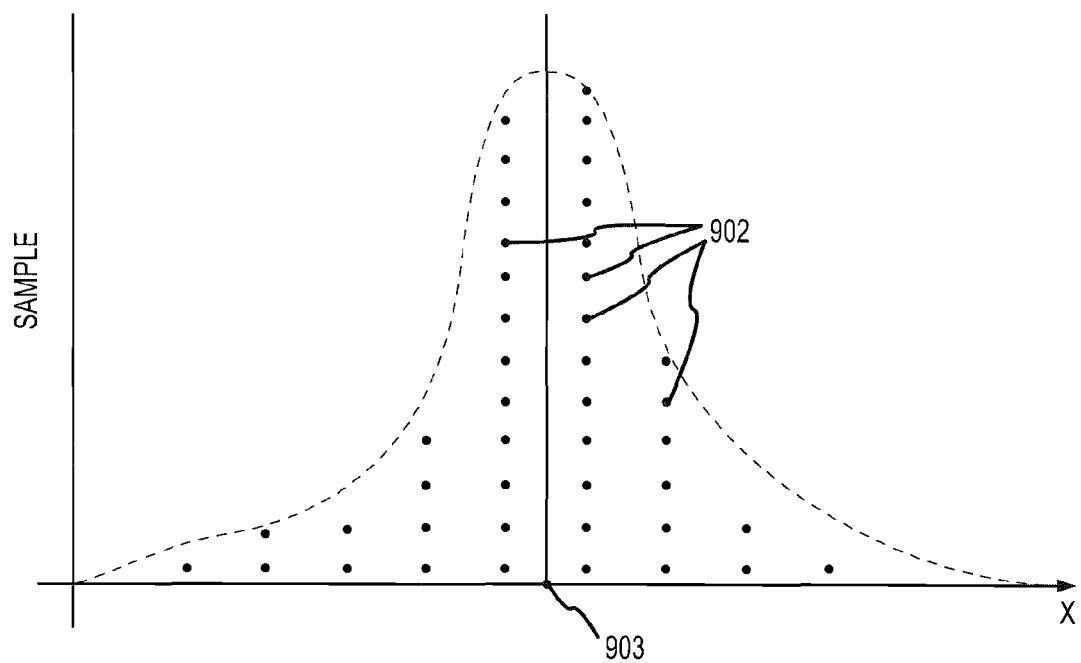

Further advantages in this regard are illustrated by FIGS. 9B and 9C. As noted above, certain multilateration technologies such as TDOA and signal strength involve calculating ranges between the acquisition module to be located and multiple external references. For purposes of illustration above, such technologies were illustrated as involving simultaneously solving equations representing certain curves. In reality, each of these ranging equations has an uncertainty, for example, relating to uncertainties in time measurements or signal strength measurements. This is graphically illustrated in FIG. 9B. Specifically, the uncertainties in these measurements correspond to a finite thickness envelope around each of the curves. As a result, the location of the acquisition module is defined by a shaded uncertainty region 900, representing the overlap of the thickness envelopes. Thus, in the illustrated example, there may be considerable uncertainty based on resolving three range curves. Although the uncertainty region 900 is illustrated in two dimensions, it will be appreciated that the uncertainty region extends in three dimensions, all of which are of interest in relation to processing seismic data.

Due to the stationary nature of the seismic array, certain statistical processing techniques can be used to reduce this uncertainty. This is illustrated in FIG. 9C. Specifically, FIG. 9C illustrates a plot of a series of range determinations between an acquisition module to be located and a given reference structure. The samples 902 may be taken over a period of time. It may be determined, theoretically or empirically, that these samples 902 define a Gaussian distribution or other defined distribution. Accordingly, statistical processes may be used to determine a projected actual range 903 based on the samples 902. This range is further depicted in FIG. 9B. By performing such statistical processes in relation to multiple reference structures, the location of the acquisition module of interest can be determined to the required accuracy.

Another feature of the present invention involves a method for designing a seismic survey based on parameters that are unique to wireless seismic survey systems. Designing a wireless seismic survey system such as the present invention involves considerations that are different from those present when designing a conventional wired system. For instance, various parameters for the wireless transfer protocol may be selected to achieve the desired performance (e.g., transmit power, antenna sensitivity, number of channels to use, data transfer rate, etc.). As an example, suppose a seismic survey is planned for a specific geographic area. A designer may choose the spacing of the data acquisition modules so as to achieve the desired resolution of the resulting seismic data. Then the transmit power and the number of wireless frequencies needed may be selected. Furthermore, the data transfer rate may be chosen based on the operating characteristics of the vibration source device, as well as transmission duty cycle of the module and length of the serial data transmission lines among other things. It will be appreciated that the examples provided includes only a few of a number of various parameters that may be considered when designing a wireless seismic survey system.

Additionally, choosing the layout of the data acquisition modules may involve unique considerations when designing a wireless system. First, the layout of the modules is not constrained by the physical connection of cables between each module. This may enable the designer to have more flexibility when choosing a particular layout. For instance, the distances between modules may be varied or randomized for various reasons (e.g., to prevent aliasing of signals). Alternatively, the layout may need to be an irregular pattern in order to avoid obstructions such as roads, bridges, rivers, buildings, etc.

Another feature of the present invention involves receiving seismic data from a wireless seismic survey system and processing and/or analyzing the data into a form that is useful for resolving the characteristics of one or more subsurface geologic structures.

The receiving step may include, for example, transferring the seismic data to a computing system that is capable of processing the data. In one embodiment, the computing system is the central control and recording system. In another embodiment, the computing system is a system other than the central control and recording system. In the latter case, the seismic data may be transferred from the central control and recording system to the computing system by any suitable method (e.g., Ethernet, 802.11 wireless protocol, USB, Fire Wire, CD-ROM, hard disk drive, etc.). Additionally, it will be appreciated that the computing system may be geographically distant from the seismic survey site. For example, in one embodiment, the seismic data may be processed by a computing system in a different country from that which the seismic survey was carried out.

The processing step may include a number of methods for manipulating the seismic data (e.g., filtering, summing, synchronizing, displaying, etc.). Generally, the processing step involves manipulating the raw seismic data by a computing system into a form that is useful for analysis. As an example, the output of the processing step may display a 3D image of a subsurface geologic structure on a suitable display device. As another example, the processing step may output frequency data, such as data formatted for spectral analysis.

Those skilled in the art will recognize that there are a number of algorithms that may be used to process seismic data into a useful form. Additionally, the processing step may include interpreting the seismic data obtained from a system such as the present invention to identify the characteristics of one or more subsurface geologic structures. This portion of the processing step may be implemented by a computing system, or by a person qualified to interpret such data.

Figure 10:
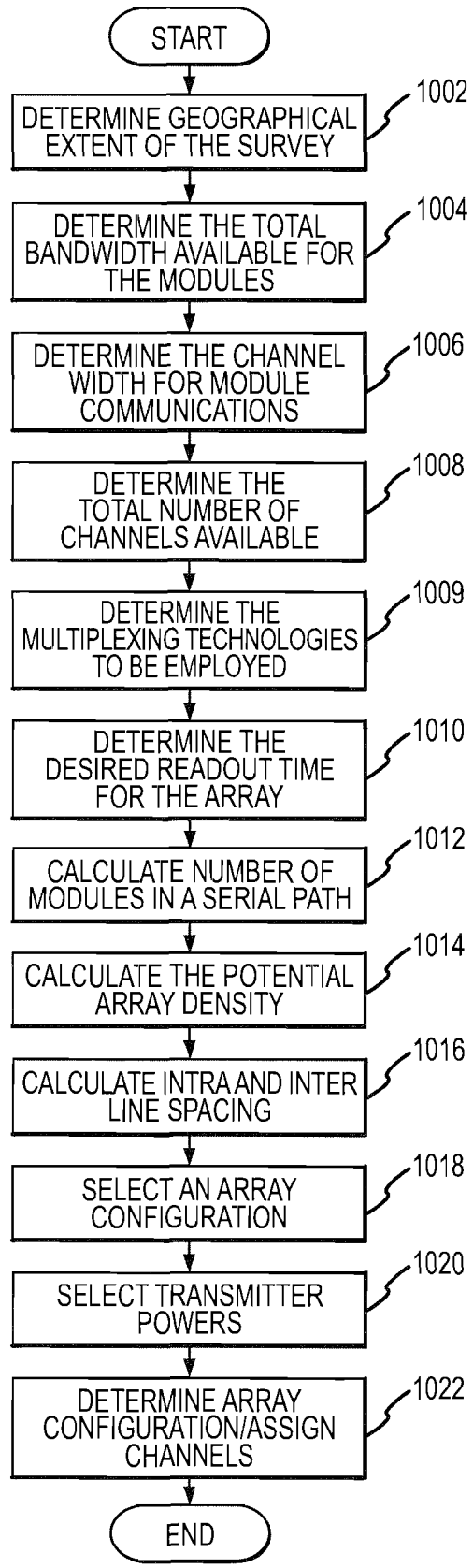
FIG. 10 is a flowchart illustrating a process for designing a wireless seismic array in accordance with the present invention.

In practice, a seismic survey may be designed with reference to the characteristics of the wireless system. An associated process 1000 is illustrated in FIG. 10. In this regard, it is noted that there is an interplay between the available bandwidth, the number of channels utilized, the multiplexing technology or technologies used and associated antenna duty cycle, and transmitter power. Thus, for example, based on the objectives of the survey, the geographical extent of the survey may be determined (1002). It will be appreciated that there may be some flexibility regarding the exact geographical extent of the survey, as well as the number and spacing of the data acquisition modules. In this regard, the designer may determine (1004) the total bandwidth that is available for use by the acquisition modules and determine (1006) the desired channel width for the communication channels used by the acquisition modules. It may be desired to provide some buffer between adjacent channels to avoid interference.

Based on the total bandwidth available and the desired channel width, the total number of channels that are available for the system can be determined (1008). In addition, the designer can determine (1009) the multiplexing technology or technologies to be used, for example, time division and frequency division multiplexing as described above. The designer can also determine (1010) the read out time that is desired for the array. For example, in the case of a vibrating energy source, it may be desired to complete read out of the array in approximately 20 seconds so as to avoid delaying operation of the source and completion of the survey.

Based on all of this information, as well as the technical specification of the modules and other array equipment, the designer can perform a number of calculations to determine possible array configurations. For example, the designer can calculate (1012) how many modules can be in a serial data transfer path. Thus, in the example described above, the modules were sampled at a rate of 500 samples per second with a resolution of 24 bits per sample. Further, each module was assumed to transmit half of the time. As a result, the first module transmits data at a rate of n (in this case, 24000 bits per second), the second module transmits at 2n (in this case, 48000 bits per second), the third module transmits at 3n (in this case, 72000 bits per second), etc., in order to prevent a backlog of data at the modules. Accordingly, there will be some maximum serial data transfer path length at which the data transfer rate required will equal the maximum data transfer rate specification of the modules. For example, if the module specification is 1 Mbit/sec., the maximum length of a serial data transfer path may be about 40 modules. The designer may use this parameter to calculate the maximum number of modules in a serial data transfer path and, hence, how frequently "backbones" of base stations or other storage/transfer units will be required. In the example, where two serial data transfer paths are interleaved in a single physical line of modules associated with a given base station, the length of the physical line, in terms of number of modules, will be twice the length of a serial data transfer path.

However, using the assumption, for ease of illustration, that data transfer rates are independent of module spacing, the configuration of the array can still vary considerably. Specifically, it is still necessary for the designer to determine the spacing between modules in a physical line, the spacing between lines, and the total number of modules to be used in the array. Conventionally, for a broad range of seismic surveys, the spacing between modules in a line may be on the order of 25-100 m, and the spacing between lines may be on the order of 100-400 m. The spacings selected are typically based on weighting the desire for improved imaging resolution against the increased survey expense associated with using a longer number of modules.

In the case of the wireless system described herein, it is anticipated that survey expense may be reduced and designers may, therefore, desire to use a denser array of modules. However, this requires that such increased density be accommodated without unacceptable signal interference between the modules. Accordingly, the designer may calculate (1014) the array density that can be achieved without unacceptable interference. For example, this may be calculated as a function of how many communication channels are available, how often they can be reused as a function of geometric space and how often they can be reused as a function of any multiplexing technology employed beyond frequency division multiplexing.

It will be appreciated that these parameters will be affected by a variety of factors such as external sources of interference, the topology of the survey landscape including any obstructions, and the like. Moreover, one of the advantages of the present invention is that laborers are not required to precisely position the modules, so actual positions may vary. Additionally, the transmit powers can be varied, before or after array deployment, and the array can be self-configuring based on expected or actual signal strength. Accordingly, some uncertainty may be accounted for in array design.

In a simple example, however, a designer may assume that channels may be reused by modules no closer than 400 m from one another (transmit powers may be tuned after deployment to match this specification). Moreover, based on the available bandwidth spectrum and the channel width required by the array equipment, the total number of channels available may be determined as discussed above. Based on this information, the designer can calculate (1016) intra and inter line spacing of modules. In practice, this may be affected by any directionality of the antennae and other factors.

For purposes of illustration, it may be assumed that 100 channels are available and that the antennae have no directional selectivity. Moreover, because only half of the modules are transmitting at any given time, the 100 channels may be reused by modules within 400 m of one another, provided that the channels are not used at the same time. Accordingly, 200 channel/time slots are available within a circle of 400 m radius (assuming no interference from adjacent regions of the array). Accordingly, if an interline spacing is desired that is four times the intraline spacing, it may be determined that an intraline spacing of about 25 m and an interline spacing of 100 m can be accommodated. Assuming that the survey objectives can at least be satisfied by the wireless array, the designer can then select (1018) a layout that is at least sufficient for the survey objectives and within the interference limits of the wireless array and/or can select (1020) a transmitter power for the acquisition units to achieve the survey objectives without undue interference. Once the general parameters of the array are thus established, the designer can determine (1022) the array configuration (addressing, for example, topography and obstructions) and can assign channels to the various acquisition units.

Figure 11:
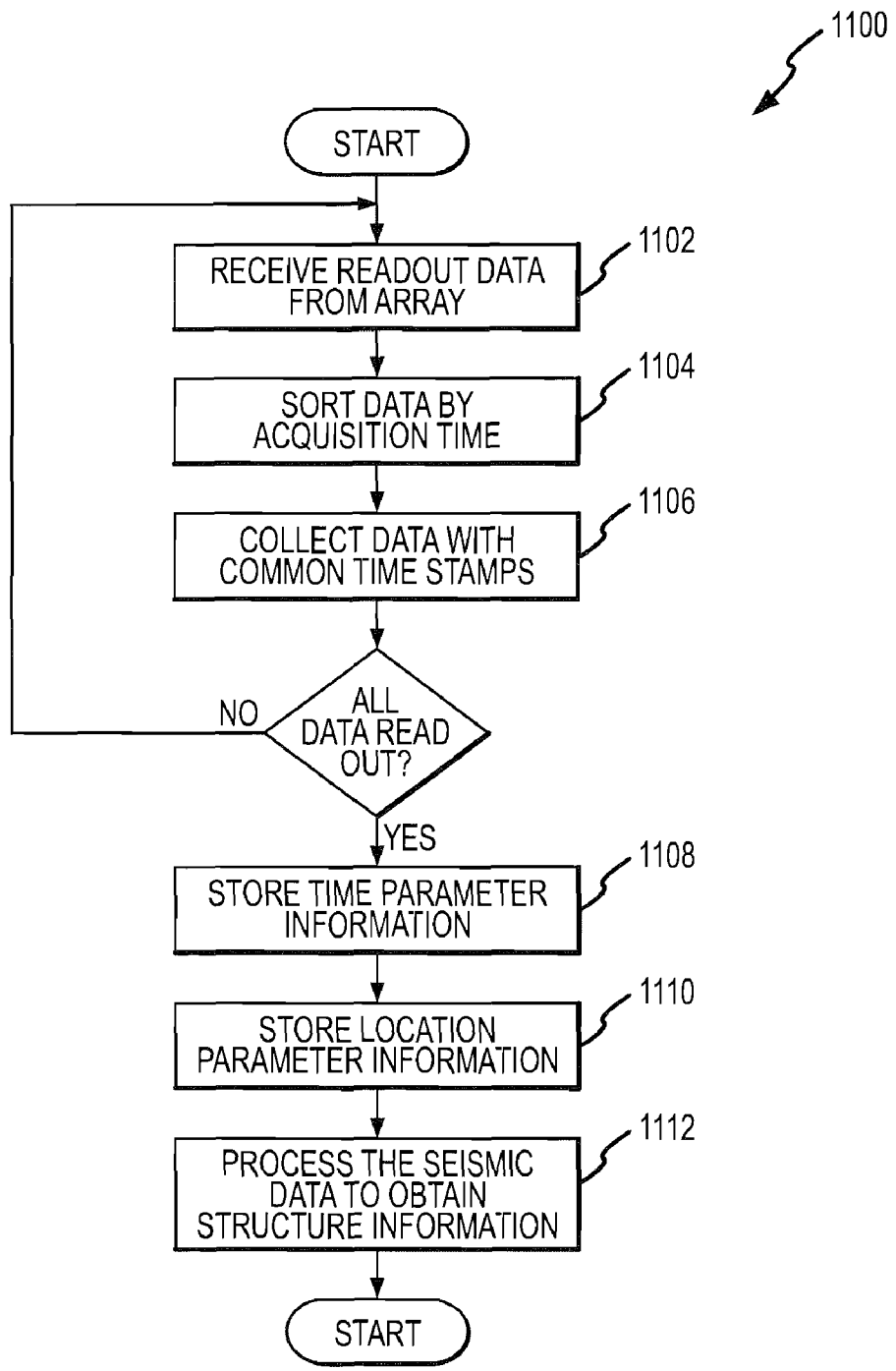
FIG. 11 is a flowchart illustrating a process for processing data from a wireless seismic in accordance with the present invention.

It will be appreciated that the processing of the data from the wireless array will also take into account the nature of the wireless system. Such processing may be executed locally at the survey location and/or remotely. For ease of reference, the following discussion references a processor, though multiple machines at multiple locations may be involved in such processing. An associated process 1100 is summarized by reference to the flow chart of FIG. 11. In the illustrated example, the processor receives (1102) the read out data from the array. It will be appreciated that, due to the read out process described above, this data will not be received in proper time sequence. That is, a first, or most remote, module in a serial data transfer path transmits data for time period n to an adjacent second module. That module then retransmits that data from the first module for time period n together with data acquired by the second module for time period n+1. This process continues down the serial data transfer path such that packets for different modules that form a single data stream have different time stamps.

Accordingly, the processor sorts (1104) the data by acquisition time. The processor then collects (1106) data from the modules associated with a common time. These steps of receiving, sorting and collecting may be repeated until data from the array is obtained corresponding to the time period of a detected seismic event. The data from any one of the modules for this time period thus defines a trace.

Processing of these traces generally requires knowledge of the time and location parameters of the data. As discussed above, the data packets will have time stamps that allow for correlation of data obtained at different modules at the same time. In this regard, reference time signals can be provided from a common system clock (or other time sources(s)) and synchronization, as between modules, is maintained via control signals transmitted serially across the array as discussed above. Accordingly, the processor stores (1108) time parameter information for the data by way of the time stamps or a packet-by-packet basis in the context of the present invention.

The process also receives (1110) location parameter information for the data. This information and the processing thereof is also a function of the location finding system context of the array. That is, as noted above, this information may be based on a multilateration process and may be statistically processed for improved accuracy. Accordingly, the information may be developed over time and may be dependent on knowledge of the location of other modules or position references, which knowledge may also be developed over time. Accordingly, at least with respect to initially acquired data, the location information may not be concurrently available. Rather, the header information or other metadata may simply identify a module, such that location information corresponding to that module can be later associated with the data.

Accordingly, the processor receives data with time and location parameter information associated therewith in a manner unique to the wireless context of the array. It will further be appreciated that the nature of the data may be a function of this wireless context, e.g., the array may be denser than normally utilized for wired arrays. Moreover, the associated processing may involve demultiplexing and noise reduction filtering as a function of the wireless context. The processor then processes (1112) the resulting data in conventional fashion to obtain information regarding subterranean structure. For example, such processing may involve normal moveout, trace stacking, etc.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences).

Accordingly, it should be understood that only the preferred embodiment and variants thereof have been shown and described and that all changes and modifications that come within the spirit of the invention are desired to be protected.

The invention claimed is:

1. A method for use in seismic data acquisition, comprising the steps of
    disposing, in series, a plurality of seismic data acquisition modules that are operative to wirelessly communicate acquired seismic data, wherein said acquisition modules define a wireless serial data transfer path for relaying data from upstream acquisition modules to downstream acquisition modules and a data collection unit;
    assigning a first acquisition module in said serial data transfer path a first transmission frequency;
    assigning a second acquisition module in said serial data transfer path a second transmission frequency, wherein said first and second transmission frequencies are different;
    first transmitting, on said first transmission frequency, seismic data from said first acquisition module to at least one downstream acquisition module; and
    second transmitting, on said second transmission frequency, seismic data from said second acquisition module to at least one downstream acquisition module;
    wherein at least a portion of said first transmitting and at least a portion of said second transmitting occur simultaneously.

2. The method of claim 1, wherein said first transmitting comprises said first acquisition module transmitting said seismic data to said second acquisition module.

3. The method of claim 2, wherein said second transmitting comprises:
    receiving a first set of seismic data from said first acquisition module;
    appending a second set of seismic data from said second acquisition module; and
    transmitting said first and second sets of seismic data to a downstream acquisition module.

4. The method of claim 1, further comprising:
    assigning said first transmission frequency to a third data acquisition module.

5. The method of claim 4, wherein said first and third acquisition modules are positioned in said serial data transmission path at first and second locations, and wherein a distance between said first and second locations is greater than a transmission range of said first and third acquisition modules.

6. The method of claim 4, wherein said third acquisition module is within a transmission range of said first acquisition module.

7. The method of claim 6, wherein said third acquisition module is operative to transmit seismic data during a transmission period that is temporally distinct from a transmission period of said first acquisition module.

8. The method of claim 6, wherein said third acquisition module form part of a different data transmission path, wherein said first and third acquisition modules are in a common seismic array.

9. The method of claim 8, wherein said third acquisition module is disposed in a second serial data transfer path.

10. An apparatus for use in seismic data acquisition, comprising:
    a plurality of seismic data acquisition modules, disposed in series, operative to wirelessly communicate acquired seismic data, wherein said acquisition modules define a wireless serial data transfer path for relaying data from upstream acquisition modules to downstream acquisition modules and a data collection unit;
    a first acquisition module in said serial data transfer path for transmitting seismic data using a first transmission frequency; and
    a second acquisition module in said serial data transfer path for transmitting seismic data using a second transmission frequency, wherein said first and second transmission frequencies are different;
    wherein said first acquisition module and said second acquisition module are operative to transmit seismic data simultaneously.

11. The apparatus of claim 10, further comprising a third data acquisition module in said serial data transfer path for transmitting seismic data using said first transmission frequency.

12. The apparatus of claim 11, wherein said and first and third acquisition modules are positioned in said serial data transfer path at first and second locations, wherein a distance between said first and second locations is greater than a transmission range each of each of said first and third acquisition modules.

13. The apparatus of claim 11, wherein said third acquisition module is within a transmission range of said first acquisition module and said first acquisition modules operative to transmit seismic data during a transmission period that is temporally distinct from a transmission period of said third acquisition module.

* * * * *

UNITED STATES PATENT AND TRADEMARK OFFICE
CERTIFICATE OF CORRECTION

| | | |
|---|---|---|
| PATENT NO. | : 7,773,457 B2 | Page 1 of 1 |
| APPLICATION NO. | : 11/538744 | |
| DATED | : August 10, 2010 | |
| INVENTOR(S) | : Crice et al. | |

It is certified that error appears in the above-identified patent and that said Letters Patent is hereby corrected as shown below:

Column 4, line 15, delete "anther" and insert therefor --another--.
Column 10, line 14, delete "form" and insert therefor --from--.

Signed and Sealed this

Ninth Day of November, 2010

David J. Kappos
*Director of the United States Patent and Trademark Office*